Sept. 30, 1941.　　　A. J. SORENSEN　　　2,257,309
BRAKE CONTROL MEANS
Filed Feb. 13, 1940　　　3 Sheets-Sheet 1

INVENTOR
ANDREW J. SORENSON
BY *R. M. Higgins*
ATTORNEY

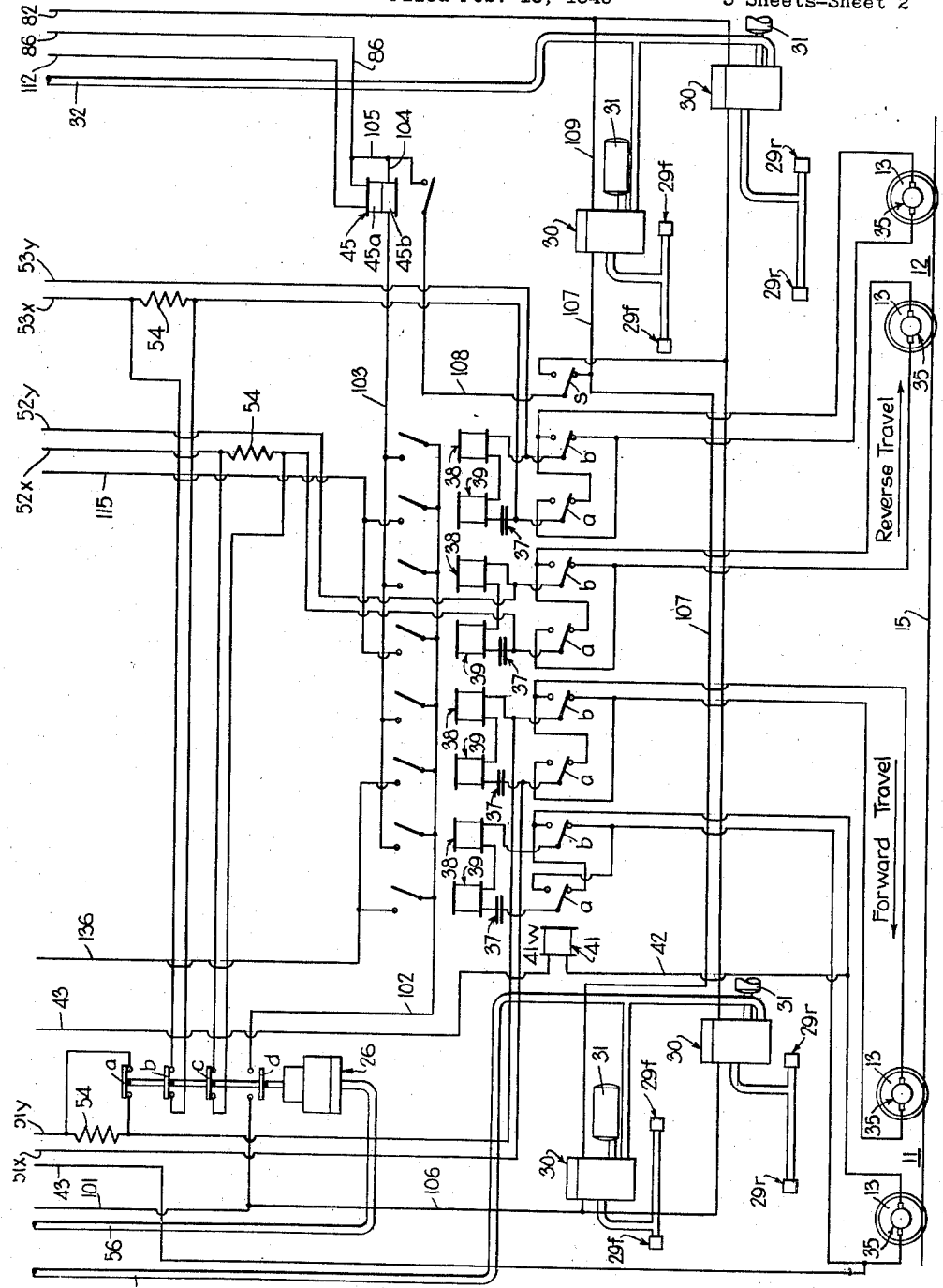

Sept. 30, 1941.    A. J. SORENSEN    2,257,309
BRAKE CONTROL MEANS
Filed Feb. 13, 1940    3 Sheets-Sheet 3
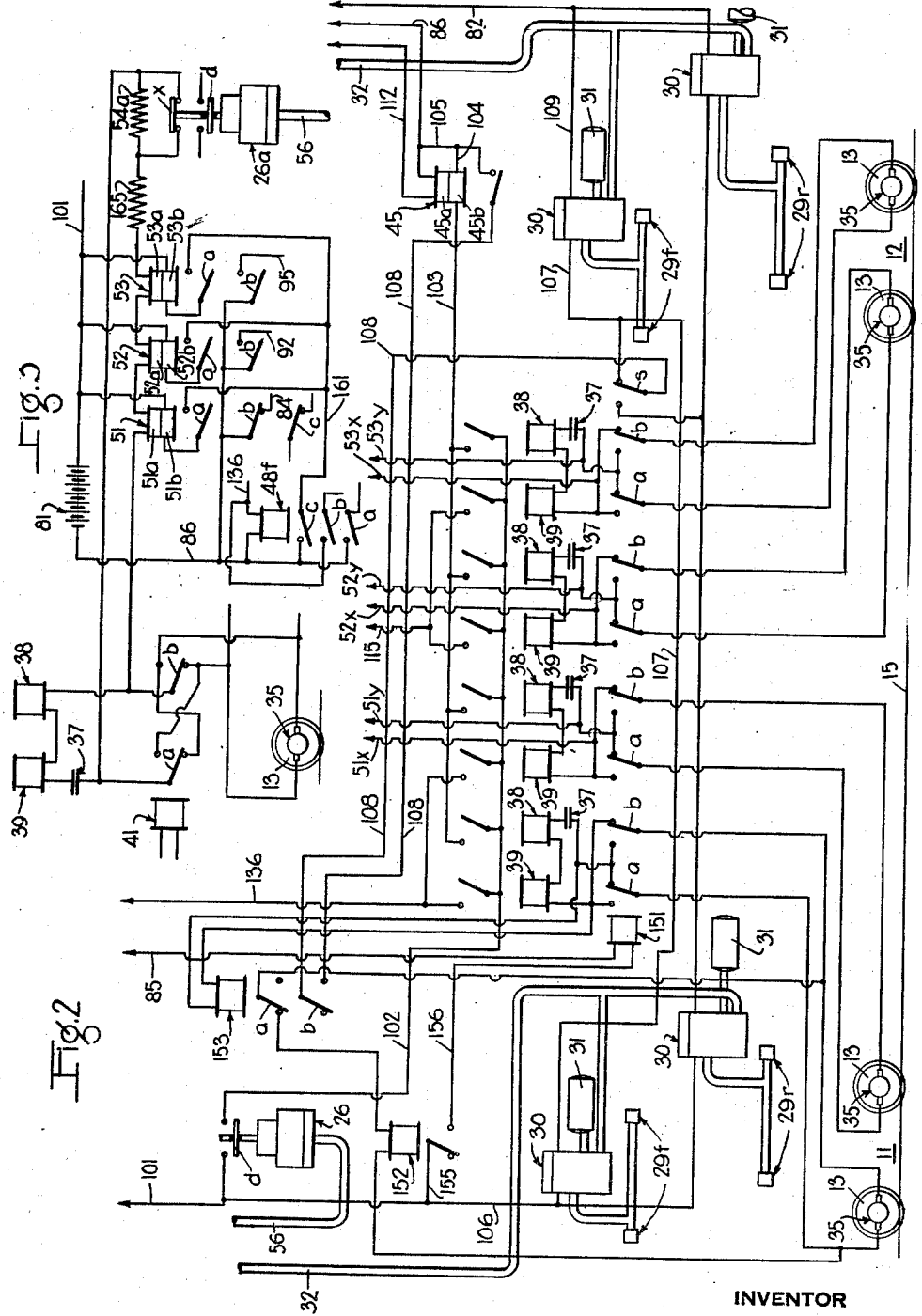
INVENTOR
ANDREW J. SORENSON
BY A.M. Higgins
ATTORNEY Patented Sept. 30, 1941

2,257,309

UNITED STATES PATENT OFFICE 2,257,309

BRAKE CONTROL MEANS

Andrew J. Sorensen, Pittsburgh, Pa., assignor to The Westinghouse Air Brake Company, Wilmerding, Pa., a corporation of Pennsylvania Application February 13, 1940, Serial No. 318,679

27 Claims. (Cl. 303—21)

This invention relates to brake control means for vehicles, such as railway cars and trains, and has particular relation to brake control equipment for automatically reducing the degree of application of the brakes as the speed of the vehicle reduces as well as to brake control equipment for automatically and rapidly releasing the brakes, when a vehicle wheel or a pair of wheels begins to slip, to prevent sliding of the vehicle wheels.

In the copending application Serial No. 306,878 of Donald L. McNeal and John Canetta, filed November 30, 1939, and assigned to the same assignee as the present application, there is disclosed a brake control equipment for railway cars and trains in which each wheel-axle is provided with a direct-current generator that supplies a voltage substantially proportional to the speed of rotation of the axle or wheels. This equipment further includes a so-called speed-controlled valve mechanism which is controlled responsively in accordance with variation of the voltage of one of the axle-driven generators to automatically reduce the degree of application of the brakes on all the wheels as the speed of the car or train reduces. The equipment further includes a so-called slip-controlled valve mechanism for each wheel truck which is adapted to operate to effect a rapid reduction in the degree of application of the wheel brakes on the corresponding wheel truck when the voltage delivered by any of the axle-driven generators of the corresponding truck reduces at a rate exceeding a certain rate and which occurs only when the wheels slip.

It is inherent in the equipment of the above-mentioned copending application that, due to the reduction in the rotative speed of a car wheel when the wheel slips, the speed-controlled valve mechanism controlled thereby momentarily vents fluid under pressure from the brake cylinders on the car and thereby causes a reduction in the degree of application of the brakes on wheel trucks having no slipping wheels. When the slipping wheel (or wheels) returns to a speed corresponding to car or train speed, the speed-controlled valve mechanism causes fluid under pressure to be resupplied to the brake cylinders. Such operation tends to lengthen the stopping distance of the car or train as well as to cause a high consumption of fluid under pressure from the fluid pressure source thereby tending to reduce the available pressure.

It is an object of my invention to provide a brake control equipment similar to that disclosed in the above-mentioned copending application Serial No. 306,878 which is, however, characterized by a novel arrangement whereby the consumption of fluid under pressure is held to a minimum and whereby the slipping of a wheel on one wheel truck can not effect a reduction in the degree of application of the brakes on another wheel truck not having a slipping wheel.

It will be apparent that by preventing the undesired reduction in the degree of application of the brakes upon a wheel truck not having a slipping wheel, the resultant higher braking effect on the car or train necessarily enables the car or train to be brought to a stop in a shorter distance than would otherwise be the case.

It is another object of my invention to provide a brake control equipment of the above-indicated character and having a novel arrangement including a plurality of axle-driven generators supplying voltage substantially proportional to the speed of rotation of different corresponding axles and the wheels fixed thereto for controlling the speed-controlled valve mechanism in a manner to effect reduction in the degree of application of the brakes as the speed of the car or train reduces.

Another object of my invention is to provide a brake control equipment of the character indicated in the foregoing objects and including a novel arrangement for effecting sanding of the track rails either automatically in response to the slipping of any of the car wheels or under manual control.

The manner in which the above objects, and other objects of my invention which will be made apparent hereinafter, are attained will be understood from the subsequent description of my invention when read in connection with the accompanying drawings, wherein:

Figs. 1A and 1B, when taken together, represent in diagrammatic form a brake control equipment, for a single car, embodying my invention, and Figs. 2 and 3 are diagrammatic fragmental views showing respectively two different modifications of the embodiment shown in Figs. 1A and 1B.

DESCRIPTION OF EMBODIMENT SHOWN IN FIGS. 1A AND 1B

Figure 1A:
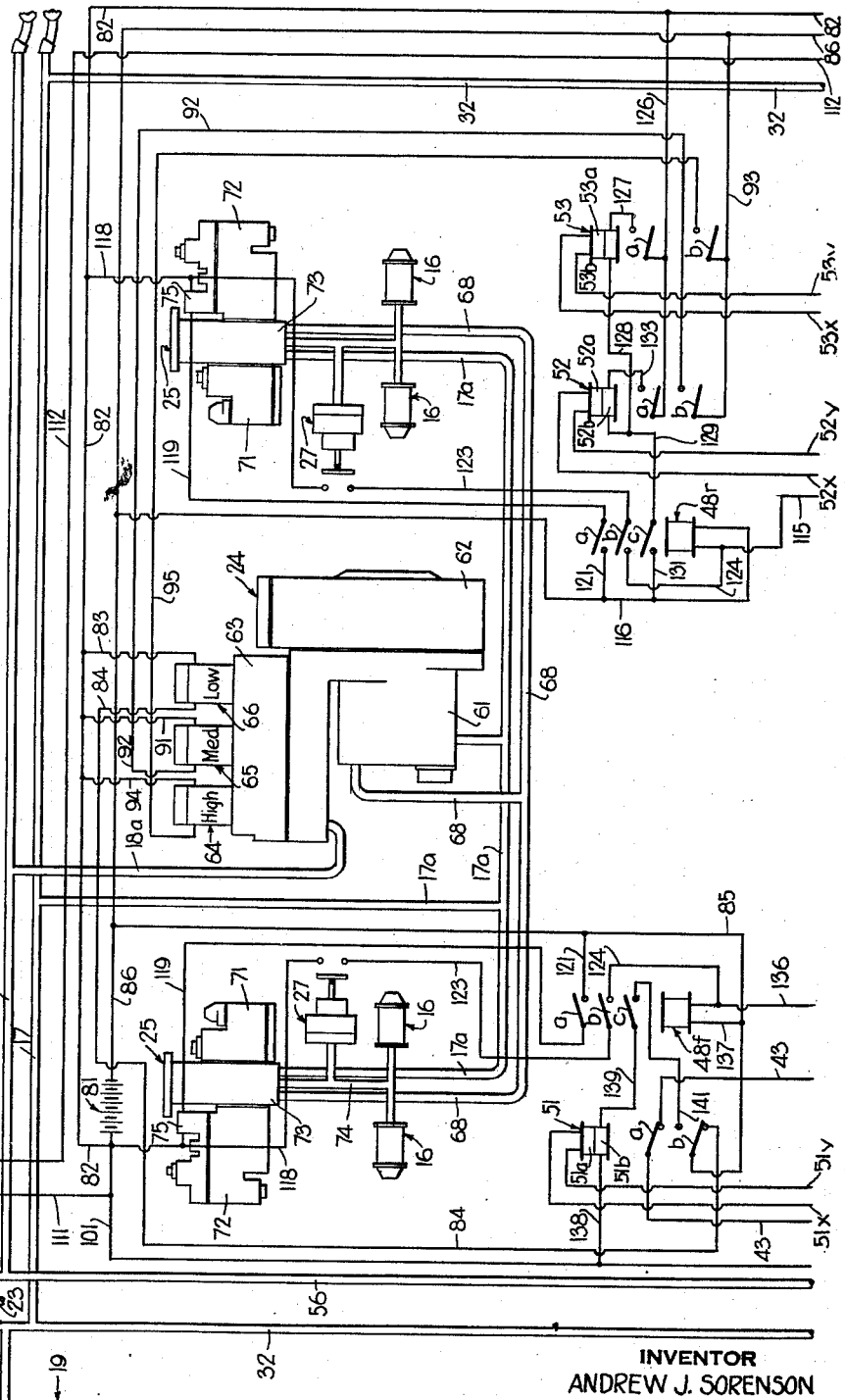

The brake control apparatus of Figs. 1A and 1B is illustrated as applied to a single railway car having two four-wheel trucks, the one at the front end of the car being referred to hereafter as the front wheel truck 11 and the one at the rear end of the car being referred to hereafter as the rear wheel truck 12. It will be understood that each wheel truck has two axles and that each axle has fixed to opposite ends thereof respectively a pair of car wheels 13 which roll on corresponding rails of the track designated by the reference numeral 15. For simplicity, only one wheel 13 is shown for each axle. In the subsequent description, the two axles of each truck will be identified as the leading axle and the trailing axle, respectively, on the assumption that the car is traveling in a forward direction and corresponding to the left-hand direction.

Associated with the car wheels 13 are brake devices, not shown, of any suitable type such as the conventional clasp type brake shoe arrangement adapted to engage the rim of the wheel or the not so familiar rotary or disk type of brake associated with the axle to which the wheels are fixed. The brake devices associated with the car wheels are adapted to be operated by fluid pressure operated devices such as the brake cylinders 16. As shown, one brake cylinder is provided for each axle but it will be understood that any desired number of brake cylinders may be provided for operating the brakes.

The apparatus for controlling the fluid pressure in the brake cylinders 16 is illustratively shown as comprising two train pipes, referred to hereinafter as the supply pipe 17 and the control pipe 18, respectively; a reservoir 19, referred to hereafter as the main reservoir and charged with fluid under pressure from a fluid compressor, not shown; a manually operated brake valve device 21 of the self-lapping type for controlling the pressure in the control pipe 18; a speed-controlled valve mechanism 24; a pair of slip-controlled valve mechanisms 25, one for each of the wheel trucks 11 and 12; a pressure operated switch 26 controlled according to the pressure in the control pipe 18; and a pair of pressure-operated switches 27, one for each wheel truck, adapted to be controlled according to the pressure in the corresponding brake cylinder.

The equipment further includes a pair of sanding devices 29f and a pair of sanding devices 29r, of conventional type, for each wheel truck. As diagrammatically indicated, one of each pair of sanding devices is associated with the leading axle and the remaining one of each pair is associated with the trailing axle of each wheel truck. The sanding devices 29f are adapted to operate upon the supply of fluid under pressure thereto to cause sanding of the track rails in advance of the associated car wheels for the forward direction of travel of the car, whereas the sanding devices 29r are adapted to operate upon the supply of fluid under pressure thereto to cause sanding of the track rails in advance of the car wheels when the car is traveling in the reverse direction.

Associated with each pair of sanding devices 29f or 29r on each wheel truck, for the purpose of controlling the supply of fluid under pressure thereto, is an electro-magnet valve device 30 and a sanding reservoir 31. The magnet valve 30 comprises a double beat valve which is biased to one of two opposite positions by a biasing spring and which is operated to the other of its two positions upon energization of a magnet winding thereof. Magnet valves of the type of the magnet valve 30 are well-known and accordingly the above description thereof is deemed sufficient for purposes of this application.

When the magnet winding of any of the magnet valves 30 is deenergized, the magnet valve establishes communication through which fluid under pressure is supplied from a corresponding one of two branch pipes 32 of the supply pipe 17 to the corresponding sanding reservoir 31 to charge the reservoir to the pressure carried in the supply pipe. Upon energization of the magnet winding of the magnet valve 30, the magnet valve closes the charging communication for the sanding reservoir associated therewith and establishes another communication through which fluid under pressure is supplied from the sanding reservoir to the corresponding sanding devices 29f or 29r, such fluid under pressure being exhausted to atmosphere through the sanding devices.

The capacity of the sanding reservoirs 31 is so designed that the fluid under pressure in the sanding reservoir is blown down to atmospheric pressure through the sanding devices 29f or 29r in a certain length of time, such as ten or fifteen seconds. Obviously, therefore, the sanding devices 29f and 29r cease to cause sanding of the track rails after a certain limited time, notwithstanding the continued energization of the magnet winding of the magnet valve 30.

The manner in which the magnet valves 30 are selectively controlled in accordance with the direction of travel of the car so the sanding of the track rails is always effected in advance of the car wheels will be explained hereinafter.

The equipment further includes a plurality of direct-current generators 35, one for each axle of each wheel truck, each generator being suitably arranged to be driven according to the speed of rotation of the corresponding axle as, for example, by mounting it in or on the journal housing at one end of the axle and having its armature shaft suitably coupled with the axle.

The generators 35 are so designed as to produce a direct-current voltage at the brush terminals thereof which is substantially proportional at all times to the speed of rotation of the corresponding axle and of the wheels fixed to the axle, the voltage being of opposite polarity for opposite directions of rotation of the corresponding wheels. Accordingly, as long as the wheels do not slip, the voltage at the brush terminals of the corresponding generator is a measure of the speed of travel of the car.

Associated with each generator 35 are an electrical condenser 37 and two so-called uni-directional relays or current-responsive devices designated by the reference numerals 38 and 39, respectively, and hereinafter referred to as the sanding relay and the slip relay, respectively. The condenser 37 and the relays 38 and 39 are connected in series relation across the brush terminals of the corresponding generator 35, in the manner readily apparent in Fig. 1B. As will be explained more fully presently, the connections of the condenser 37 and relays 38 and 39 to the brush terminals of the corresponding generator are under the control of a reversing switch device 41, in the form of a polarized relay, which is controlled in the manner more fully explained hereinafter in accordance with the polarity of the voltage at the brush terminals of the generator 35 of the leading axle on the front wheel truck 11 and consequently in accordance with the direction of travel of the car.

The arrangement of the condenser 37 and the relays 38 and 39 is such that the current through the magnet windings of each of the relays 38 and 39 is proportional to the rate of change of voltage across the brush terminals of the corresponding generator and is in itself not my invention. It will be seen that when the car is accelerating and the voltage across the brush terminals of a generator 35 is increasing at a corresponding rate, a charging current proportional to the rate of increase of generator voltage and therefore of the rate of acceleration of the car flows in the corresponding circuit to charge the condenser 37, the direction of flow of current depending upon the polarity at the brush terminals of the generators. Conversely, when the car is decelerating, the condenser 37 discharges current in the circuit in the opposite direction to the charging current, the discharging current being proportional to the rate of reduction of generator voltage and therefore of the rate of deceleration of the car.

As previously indicated, the relays 38 and 39 are uni-directional in character, that is, they are operated only in response to a current in one direction and in excess of a certain value. As will be hereinafter more fully explained, the reversing switch device 41 so controls the connection of the relays 38 and 39 and the condenser 37 to the brush terminals of the corresponding generator 35 that the direction of flow of current through the magnet windings of the relays is always in such a direction as to cause operation of the relays when the car is decelerating and the voltage at the brush terminals of the corresponding generator correspondingly decreasing, notwithstanding a reversal of polarity at the brush terminals of the generator in accordance with the reversal of a direction of travel of the car.

The magnet winding of each of the relays 38 is so designed that the single contact member of the relay is actuated from its open position shown to its closed position and maintained in the closed position whenever and as long as the current energizing the magnet winding of the relay exceeds a certain value corresponding to a certain rate of deceleration of the car, for example, four miles per hour per second.

The magnet winding of each of the relays 39 is so designed as to cause operation of the single contact member of the relay from its open position to its closed position and to maintain it in its closed position whenever and as long as the current energizing the magnet winding exceeds a certain value corresponding to a certain rate of rotative deceleration of the associated vehicle wheels, such as ten miles per hour per second, and occurring only when the wheels slip.

It will be understood, therefore, that since a rate of rotative deceleration of the car wheels of four miles per hour per second may be attained ordinarily without slipping of the wheels, the relays 38 may be operated without slipping of the vehicle wheels, whereas the relays 39 are never operated unless the corresponding wheels slip.

In order to clarify more fully the operational characteristics of the relays 38 and 39, a brief explanation as to the meaning of the word "slip" as employed herein is believed desirable at this point. The term "slip," as employed herein, refers to the rotation of a vehicle wheel at a speed less than a speed corresponding to the vehicle speed at a given instant and resulting from the application of the brakes to a degree sufficient to exceed the adhesion between the wheel and the rail. When the adhesion between the wheel and the rail is exceeded, the wheel decelerates rapidly at rate exceeding fifteen and even twenty miles per hour per second toward a locked or non-rotative state. Obviously, therefore, in decelerating toward a locked condition, the rotative speed of the wheel reduces below that corresponding to the speed of travel of the car.

If the degree of application of the brakes is instantly and rapidly reduced in response to the deceleration of a slipping wheel, the wheel ceases to decelerate and begins to accelerate back toward a speed corresponding to vehicle speed without actually attaining the locked condition. Various automatic mechanisms and devices have been devised for this purpose and an arrangement for effecting such a result is included in the present equipment, as will be later described.

If the application of the brakes on a vehicle wheel is such as to exceed the adhesion between the wheel and the rail and the degree of the application is not reduced or not reduced soon enough, the wheel decelerates to a locked condition and slides, that is, it drags along the rail in a non-rotative or locked condition. The two terms "slip" and "slide," as employed herein accordingly refer to different conditions of a vehicle wheel, the term "slip" referring to a rotating condition and the term "slide" referring to a non-rotating condition of the wheel.

As diagrammatically shown, the reversing switch or polarized relay 41 comprises a suitable magnet winding designated 41w and a plurality of two-position contact fingers or members. The contact fingers include one contact finger s and four pairs of contact fingers, the contact fingers of each pair being designated a and b respectively.

As will be apparent, the one terminal of the magnet winding 41w of relay 41 is connected by a wire 42 to one brush terminal of the generator 35 associated with the leading axle of the front wheel truck 11 while the other terminal of the winding 41w is connected to the opposite brush terminal of the said generator by a wire 43 including in series therein a back-contact member of a relay 51 hereinafter described.

Each pair of contact fingers a and b of the relay 41 is arranged to control a corresponding generator circuit for the purpose previously mentioned. The contact finger s selectively controls the energization of the magnet windings of the sanding magnet valves 30 in accordance with the direction of travel of the car.

When the car is traveling in a forward direction, indicated by the arrow in the lower part of Fig. 1B, the polarity of the generators 35 is such that the direction of flow of current through the magnet winding 41w of the relay 41 causes the pairs of contact fingers a and b and the contact fingers s to assume the position in which they are shown. When the car is traveling in the reverse direction, indicated by the arrow in the lower part of Fig. 1B, the polarity of the generators 35 is correspondingly reversed and therefore the current flows through the winding 41w flows in the opposite direction and causes the pairs of contact fingers a and b and the contact fingers s to be shifted from the position shown to the opposite or upper position. As previously indicated, therefore, notwithstanding a reversal of travel of the car, the direction of flow of current supplied to the windings of the relays 38 and 39 is the same for acceleration and deceleration respectively.

As will be explained more fully hereinafter, the contact members of the sanding relays 38 for all the car wheel axles are arranged in parallel relation so that the operation of any of the relays 38 is effective to cause operation of a so-called sanding control relay 45.

The sanding control relay 45 is a conventional direct current relay of the neutral type, having two magnet windings 45a and 45b each effective, when energized, to cause operation of the single contact member of the relay from its open position, in which it is shown, to its closed position. With the contact member of the relay 45 in its closed position, a circuit is established for energizing the sanding magnet valves 30 for the forward sanding devices 29f or the reverse sanding devices 29r depending upon the position of the contact finger s of the reversing switch device 41.

The contact members of the sanding relays 38 are arranged to control the magnet winding 45b of the sanding control relay 45. The winding 45a of the relay 45 is adapted to be energized by manual operation of a switch device 46 which is located in the operator's control cab a place convenient to the operator, as indicated in Fig. 1A.

The slip relays 39 for the front wheel truck 11 have their contact members arranged in parallel relation so that operation of either of the two relays is effective to energize or pick-up a so-called slip-control relay 48f (Fig. 1A). In a similar manner, the slip relays 39 for the rear wheel truck 12 have their contact members arranged in parallel relation so that operation of either of the two relays is effective to cause energization or pick-up of a corresponding slip-control relay, designated 48r (Fig. 1A).

The slip control relays 48f and 48r are conventional relays of the neutral type and, as indicated diagrammatically in Fig. 1A, comprise a suitable magnet winding and three contact fingers designated a, b and c, respectively. These contact fingers are in the open position thereof when the magnet winding of the relay is deenergized and are actuated to the closed position thereof when the winding of the relay is energized. The function of the contact members of the relays 48f and 48r will be described hereinafter in detail but it may be said at the present time that the operation of either of the relays 48f causes operation of the corresponding slip-controlled valve mechanism 25 to cause a rapid reduction of the fluid pressure in the brake cylinders 16 controlled by the valve mechanism.

The equipment further comprises three voltage-responsive relays, hereafter referred to as the speed relays 51, 52 and 53 respectively, as shown in Fig. 1A, the relay 51 having been previously mentioned. As indicated diagrammatically, each of the relays 51, 52 and 53 has two electromagnet windings, one of which is a pick-up winding and the other of which is a holding winding, designated by the same number as the corresponding relay with the suffix letters a and b respectively. In addition each of the relays 51, 52 and 53 comprises a pair of contact fingers designated a and b respectively. The character and operation of these contact fingers will be made apparent hereinafter.

The windings 51a, 52a and 53a of the respective relays are severally connected across the brush terminals of different corresponding generators 35, under the control of different pairs of contact fingers a and b of the reversing switch device 41, so as to be energized by a voltage of the same polarity during deceleration of the car, independently of the direction of the travel of the car.

The various circuits for energizing the pick-up windings 51a, 52a and 53a will be readily apparent because, as shown, the windings are connected by a pair of wires, designated respectively by the same number as the relay with the suffix letters x and y, in parallel relation to the series-connected condenser 37, sanding relay 38 and slip relay 39, for the corresponding generator 35. Thus, the pick-up coil 51a is connected in parallel with the corresponding condenser 37, sanding relay 38, and slip relay 39 by wires 51x and 51y.

The windings 51a, 52a and 53a are respectively so designed as to pick-up the contact members of the corresponding relays at different voltages and corresponding different speeds of travel of the car. Thus, the winding 51a of the relay 51 is so designed that when the voltage at the brush terminals of the generator 35 associated with the trailing axle of the front wheel truck 11 exceeds a voltage occurring at a speed of twenty miles per hour of the car, the contact members of the relay are picked-up.

The winding 52a of the relay 52 is so designed as to cause pick-up of the relay contact members only when the voltage supplied by the generator 35 associated with the leading axle of the rear wheel truck 12 exceeds a value corresponding to a speed of forty miles per hour of the car.

The winding 53a is so designed that it is not effective to cause pick-up of the contact members of the relay 53 until the voltage supplied by the generator 35 associated with the trailing axle of the rear wheel truck 12 exceeds a value corresponding to a speed of sixty-five miles per hour of the car.

As is well known by those familiar with the electrical relay art, a lesser energizing current for the magnet winding of a relay is required to hold the contact members in a picked-up position than is required to cause the contact members to be initially picked-up, because of the closing of the gap between the magnetic armature and magnetic core of the relay when the contact fingers are picked-up.

In order, therefore, to cause the relays 51, 52 and 53 to drop-out at substantially the same speed at which they are picked-up, I provide in each of the respective energizing circuits for the relay windings 51a, 52a and 53a, a resistor 54, and in addition arrange the pressure switch 26 in a manner to control the shunting and unshunting of the three resistors 54 simultaneously.

The pressure switch 26 may be of any suitable type comprising, for example, a movable abutment or piston, not shown, normally biased in one direction as by a spring and operated in the opposite direction in response to the pressure of fluid supplied to the one side thereof through a branch pipe 56 of the control pipe 18. As shown diagrammatically in Fig. 1B, the pressure switch 26 comprises, further, three back-contact members designated a, b and c respectively, and a front-contact member d, the back-contact members being in closed position and the front contact member in open position when the pressure in the control pipe 18 and supplied to the pressure switch is below a certain low value, such as five pounds per square inch. The pressure switch 26 is further so designed that when the pressure supplied thereto from the control pipe 18 exceeds the pressure of five pounds per square inch, the front-contact member is actuated to its closed position and the back-contact members are actuated to their open positions.

As will be explained more fully hereinafter, the control pipe 18 is normally at atmospheric pressure and is charged to a selected pressure under the control of the brake valve 21 to cause application of the brakes associated with the vehicle wheels to a degree corresponding to the pressure established in the control pipe. It follows, therefore, that the back-contact members a, b and c of the pressure switch 26 are normally in their respective closed positions when the brakes are released and the car is being propelled under power.

As will be apparent in Fig. 1B, the back-contact members a, b and c of the pressure switch 26 are arranged to establish a shunt connection around one of the resistors 54 corresponding thereto and to remove or interrupt such shunt connections when actuated to open position.

It will thus be apparent that the resistors 54 are cut into the circuit of the corresponding relay windings 51a, 52a and 53a when an application of the brakes is in effect whereas these resistors are shunted out of the circuit when the car is being driven under power or coasting with the brakes released.

The resistors 54 are of such resistance that when cut into the circuit of the corresponding winding 51a, 52a, or 53a, the voltage impressed on the winding is so reduced that the contact members of the corresponding relay will be dropped-out at substantially the same speed at which they were picked-up.

As will be explained more fully hereinafter, the speed relays 51, 52 and 53 are adapted to control the speed-controlled valve mechanism 24 in a manner to vary the pressure of the fluid supplied to the brake cylinders 16 dependent upon the speed of travel of the car. The speed-controlled valve mechanism 24 is effective, as hereinafter described, to vary the pressure in all of the brake cylinders on the car. Therefore, if any pair of car wheels, such as the wheels on the trailing axle of the rear wheel truck 12 were to slip while none of the wheels on the front wheel truck 11 slip, the valve mechanism 24 would be operated momentarily in response to the reduced speed of the slipping wheels to effect a reduction of the pressure in the brake cylinders associated with other wheels that are not slipping.

In order to prevent such operation and therefore conserve the supply of fluid under pressure on the car, I have provided an arrangement according to my invention for preventing a variation in the condition of the speed-controlled valve mechanism 24 in response to the slipping of any of the wheels. To this end I arrange the lower coils 51b, 52b and 53b of the speed relays as holding coils for maintaining the contact members of the corresponding speed relays in their picked-up position independently of the pick-up windings 51a, 52a and 53a. The circuit for energizing each holding coil 51b, 52b and 53b is under the control of a corresponding slip-control relay 48f or 48r and a self-holding contact of the speed relay itself. This arrangement will be described in greater detail later on in connection with an assumed operation of the equipment.

Before describing the operation of the equipment, a brief description of the brake valve device 21, the speed-controlled valve mechanism 24 and the slip-controlled valve mechanisms 25 will be given.

The brake valve device 21 is of the type described and claimed in Patent 2,042,112 of Ewing K. Lynn and Rankin J. Bush. Briefly, it comprises an operating handle 22 for operatively moving a rotary operating shaft of a self-lapping valve mechanism. In the normal release position of the brake valve handle 22, the self-lapping valve mechanism of the brake valve device is conditioned to vent the control pipe 18 to atmosphere through the exhaust port 23. When the brake valve handle is shifted out of its release position in a horizontal plane into a zone, referred to as the application zone, the self-lapping valve mechanism is operative to supply fluid under pressure to the control pipe 18 from the supply pipe 17 and connected main reservoir 19. The self-lapping valve mechanism is so designed as to establish a pressure in the control pipe 18 corresponding substantially to the degree of displacement of the brake valve handle 22 out of its release position. If the pressure in the control pipe tends to reduce for some reason, such as leakage, while the brake valve handle is in a certain application position, the self-lapping valve mechanism is automatically effective to continue to supply fluid under pressure to the control pipe to maintain a pressure therein corresponding to the position of the brake valve handle.

It will be understood that the pressure in the control pipe 18 may be controlled by any suitable apparatus and that it is not my intention to limit the control of the pressure in the pipe 18 to a self-lapping brake valve of the type described.

The speed-controlled valve mechanism 24 is of the type described and claimed in Patent 2,140,624 of E. E. Hewitt. Briefly, it comprises a self-lapping relay valve portion or section 61, a diaphragm section 62 comprising a plurality of coaxially spaced unconnected movable abutments or diaphragms of different effective pressure areas respectively, and a magnet valve section 63 including a so-called high magnet valve 64, a medium magnet valve 65 and a low magnet valve 66.

The magnet valves 64, 65 and 66 respectively control the supply of fluid under pressure to and the release of fluid under pressure from a corresponding one of the chambers formed in the diaphragm section 62 between the successive diaphragms, thereby controlling the balance or unbalance of fluid pressure forces on the several diaphragms so that only one of the diaphragms is effective selectively to cause operation of the relay valve device in the relay valve section 61. In view of the fact that the diaphragms are of different effective pressure areas, it will be understood that the relay valve section 61 is effective to supply fluid at different pressures for a given control pressure acting on the diaphragms depending upon which of the diaphragms is effective.

The magnet valves 64, 65 and 66 are so arranged that when only the low magnet valve 56 is energized, fluid under pressure is supplied from the control pipe 18 through a pipe 18a thereof to a chamber at one side of the smallest diaphragm. The relay valve section 61 is accordingly operative to supply fluid under pressure from the supply pipe 17, through a branch pipe 17a thereof, to a pipe 68 which has two branches one of which leads to the slip-controlled valve mechanism 25 for the front wheel truck 11 and the other of which leads to the slip-controlled valve mechanism 25 for the rear wheel truck 12. The pressure established by the relay valve section 61 in the pipe 68 leading to the slip-controlled valve mechanisms 25 varies in accordance with the variation of the pressure in the control pipe 18 but always bears a fixed ratio thereto depending upon which of the diaphragms is effective to operate the relay valve section 61. In the case of the smallest diaphragm, the pressure established in the pipe 68 bears a minimum ratio to the pressure established in the control pipe 18 and may be, for example, one-third of the pressure established in the control pipe.

When the magnet windings of all of the magnet valve devices 64, 65 and 66 are deenergized, fluid under pressure is supplied from the control pipe 18 to both sides of the smallest diaphragm and one side of the next largest diaphragm so that the relay valve section 61 is correspondingly operated to deliver a higher pressure in response to the same control pipe pressure. Thus the ratio of the pressure established in the pipe 68 to the pressure established in the control pipe 18 with all of the magnet valves deenergized may be such that the pressure in the pipe 68 is always one-half of the pressure in the control pipe 18.

When only the medium magnet valve 65 is energized, fluid under pressure is supplied to both sides of the smallest diaphragm and of the next larger diaphragm and to one side of the third largest diaphragm so that the relay valve section 61 is correspondingly operated to establish a pressure in the pipe 68 which bears a still higher ratio to the pressure in the control pipe. Thus, with the medium magnet valve 65 only energized, the pressure established in the pipe 68 may be three-fourths of the pressure established in the control pipe 18.

When the high magnet valve 64 and the medium magnet valve 65 are energized while the low magnet valve 66 is deenergized, fluid under pressure is supplied from the control pipe 18 to both sides of the three smaller diaphragms and to one side of the largest diaphragm so that the relay valve section 51 is operative to supply fluid to the pipe 68 at a still higher ratio to the pressure in the control pipe 18. Thus, in such case, the pressure established in the pipe 68 may bear a one-to-one ratio with respect to the control pipe pressure, that is, it may be equal to the pressure in the control pipe.

It will be thus apparent that the ratio of the pressure established in the pipe 68 with respect to the pressure established in the control pipe 18 depends upon the effective pressure area of the particular diaphragm which is rendered effective to operate the relay valve section 61. The areas of the diaphragms may be selected as desired and it should therefore be understood that the above figures employed are merely illustrative.

The slip-controlled valve mechanism 25 for each wheel truck is of the type described in detail and claimed in the copending application Serial No. 292,833 of Donald L. McNeal, filed August 31, 1939, and assigned to the assignee of this application. Briefly, each valve mechanism 25 comprises a relay valve section 71 and a magnet valve section 72, the two sections being secured to opposite faces respectively of an intermediate pipe bracket section 73.

The relay valve section 71 comprises a self-lapping valve mechanism which has an operating piston that is subject on one face thereof to the pressure of fluid supplied through pipe 68 from the speed-controlled valve mechanism 24. The relay valve section of each valve mechanism 25 is operative according to the fluid pressure supplied to the operating piston thereof to cause fluid under pressure to be supplied at a corresponding pressure from a branch of the supply pipe 17a to a pipe 74 leading to the brake cylinders 16 for the corresponding wheel truck.

The magnet valve section 72 of each valve mechanism 25 includes a magnet valve device 75. The magnet valve device 75 is effective, when deenergized to permit the flow of fluid under pressure from the supply pipe 68 to the pressure chamber associated with the operating piston of the relay valve section 71 and, when energized, to cut off such supply and to rapidly release fluid under pressure from the pressure chamber so that the relay valve mechanism operates to effect a corresponding rapid reduction of the fluid pressure in the brake cylinders 16.

In addition, the magnet valve portion 72 includes valve mechanism which is effective, once the magnet valve device 75 is energized, to cause the rate of flow of fluid under pressure from the supply pipe 68 to the pressure chamber associated with the operating piston of the relay valve section 71 to be restricted to a rate lower than the normal rate as long as the pressure in the supply pipe 68 exceeds a certain low pressure, such as five pounds per square inch.

It will be noted that a pressure switch 27 is connected to the pipe 74 leading to the brake cylinders 16 of each wheel truck so as to be controlled according to the fluid pressure in the brake cylinders. The pressure switches 27 may be of any suitable construction so as to be operated to a closed position when the pressure in the corresponding brake cylinders 16 exceeds a certain pressure, such as ten pounds per square inch, and operated to open position when the pressure in the brake cylinders reduce below such certain pressure. The pressure switches 27 function respectively to maintain a holding circuit for the slip-control relays 48f or 48r in the manner and for a purpose subsequently to be explained.

OPERATION OF EQUIPMENT SHOWN IN FIGS. 1A AND 1B

*(a) Conditioning of equipment*

Let it be assumed that the main reservoir 19 is charged to the normal pressure carried therein, for example one hundred pounds per square inch, and that the supply pipe 17 and the sanding reservoirs 31 are thus correspondingly charged with fluid under pressure.

Let it be further assumed that the car is at a standstill and that the brake valve handle 22 is in its release position so that the control pipe 18 is correspondingly at atmospheric pressure. As will be seen hereinafter, fluid under pressure is accordingly exhausted from all the brake cylinders 16 so that the brakes are released. Both of the pressure switches 27 are thus correspondingly in open position. At the same time, the pressure switch 26 is in the normal position thereof shown in Fig. 1B, due to the pressure in the control pipe being at atmospheric pressure.

With the car at a standstill, the generators 35 associated with the wheels are accordingly not producing any voltage and accordingly none of the speed relays 51, 52 and 53 are picked-up.

In such case, therefore, contact member $b$ of relay 51 is effective in its dropped-out position to establish a circuit for energizing the magnet winding of the low magnet valve 66 of the speed-controlled valve mechanism 24. This circuit extends from one terminal, assumed hereafter to be the positive terminal, of a suitable battery 81, by way of a wire 82, branch wire 83, magnet winding of the magnet valve 66, a wire 84, contact member $b$ of relay 51, and wires 85 and 86 back to the negative terminal of the battery 81.

The contact member $b$ of each of the speed relays 52 and 53 is in open position when the relay is dropped-out. The several circuits for energizing the magnet winding of the magnet valve 65 and of magnet valve 64 are accordingly interrupted and the magnet windings are de-energized. These circuits will be traced hereinafter.

With only the magnet valve 66 of the speed-controlled valve mechanism 24 thus energized, it will be seen that the speed-controlled valve mechanism is conditioned to supply fluid under pressure to the supply pipe 68, at a pressure having the minimum ratio to the pressure in the control pipe 18, as and when the control pipe is charged with fluid under pressure.

Let it now be assumed that with the brake valve handle 22 remaining in its release position, the operator operates a suitable power controller, not shown, to start the car in the forward direction, indicated by the arrow as movement in the left-hand direction.

When the car exceeds a certain low speed, such as five miles per hour, the voltage produced at the brush terminals of the generator 35 associated with the leading axle of the front wheel truck 11 is sufficient to cause operation of the polarized relay 41 to the position corresponding to the forward direction of travel, if the relay is not already in such position. Thus substantially at the time the car starts to travel, the pairs of contact members $a$ and $b$ of the polarized relay 41 are shifted to the correct position corresponding to the direction of travel. It is assumed that these contact members are correctly positioned as shown in Fig. 1B for the forward travel of the car.

When the speed of the car increases further and exceeds the speed of twenty miles per hour, the voltage across the brush terminals of the generator 35 associated with the leading axle of the front wheel truck 11 has increased sufficiently to cause pick-up of the contact members $a$ and $b$ of the speed relay 51. The contact member $a$ of the relay 51, as previously mentioned, is a back-contact member and is effective in its dropped-out position to establish the circuit for energizing the magnet winding 41$w$ of the polarized relay 41, and when actuated to its picked-up position interrupts the circuit for energizing the winding of the relay 41, thereby removing the current load of the relay winding from the generator. The contact members of the relay 41, however, remain in the position to which they were actuated and do not change their position unless the direction of flow of current through the magnet winding of the relay is subsequently reversed in accordance with a reversal of the direction of travel of the car.

The contact member $b$ of the relay 51 is effective, when picked-up, to interrupt the previously traced energizing circuit for the low magnet valve 66. In its picked-up position, the contact member $b$ of the relay 51 has no immediate effect but it conditions a circuit for causing energization of the holding coil 51$b$ of the relay 51 when the slip-control relay 48$f$ is subsequently picked-up in the manner hereinafter to be described.

Let it be further assumed that the speed of the car continues to increase until it exceeds forty miles per hour. In such case, the voltage produced at the brush terminals of the generator 35 associated with the leading axle of the rear wheel truck 12 is sufficient to cause pick-up of the speed relay 52. The contact member $a$ of relay 52 is ineffective in its picked-up or closed position to cause any immediate result but it conditions a circuit for causing energization of the holding coil 52$b$ of the relay 52 in response to the pick-up of the slip-control relay 48$r$ in the manner hereinafter to be described. The contact member $b$ of the relay 52 is effective in its picked-up position to close a circuit for energizing the medium magnet valve 65 of the speed-controlled valve mechanism 24. This circuit extends from the positive terminal of the battery 81 by way of the wire 82, a branch wire 91, magnet winding of the medium magnet valve 65, a wire 92, contact member $b$ of the relay 52, a wire 93, and wire 86 back to the negative terminal of the battery 81.

Assuming further that the speed of the car continues to increase until it exceeds a speed of sixty-five miles per hour, the voltage produced across the brush terminals of the generator 35 associated with the trailing axle of the rear wheel truck 12 increases to a value sufficient to cause pick-up of the relay 53. The contact member $a$ of the relay 53 is ineffective in its picked-up or closed position to cause any immediate result but it conditions a circuit for causing energization of the holding winding 53$b$ of the relay 53 in response to the pick-up of the slip-control relay 48$r$ in the manner hereinafter to be described. The contact member $b$ of the relay 53 is effective in its picked-up or closed position to close a circuit for energizing the magnet winding of the high magnet valve 64 of the speed-controlled valve mechanism 24. This circuit extends from the positive terminal of the battery 81 by way of the wire 82, a branch wire 94, magnet winding of the high magnet valve 64, a wire 95, contact member $b$ of the relay 53, and wires 93 and 86 back to the negative terminal of the battery 81.

Let it now be assumed that, while the car is traveling at a speed in excess of sixty-five miles per hour, the operator desires to bring the car to a stop. To do so, the operator first returns the power controller to "off" position and then shifts the brake valve handle 22 into the application zone an amount corresponding to the desired degree of application of the brakes. The control pipe 18 is accordingly charged to a pressure of, for example, sixty pounds per square inch. Since the high magnet valve 64 and the medium magnet valve 65 of the valve mechanism 24 are energized while the low magnet valve 66 is deenergized, it will be apparent from previous explanation that the relay valve section 61 of the valve mechanism 24 will supply fluid, at a pressure equal to the pressure established in the control pipe, to the pressure chamber associated with the operating piston of the relay valve section 71 of both of the slip-controlled valve mechanisms 25. As previously explained, the valve mechanisms 25 accordingly operate to supply fluid under pressure to the associated brake cylinders 16 at a corresponding pressure, thereby effecting application of the brakes on the vehicle wheels to a degree corresponding to the degree of pressure established in the control pipe 18.

Due to the establishment in the control pipe 18 of a pressure in excess of five pounds per square inch, the pressure switch 26 is accordingly operated to shift the front-contact member d thereof to its closed position and the back-contact members a, b and c thereof to open position, thereby removing the shunt connection around the several resistors 54 in the respective energizing circuits for the speed relays 51, 52 and 53 in the manner hereinbefore described. The effect of the closing of the contact member d of the pressure switch 26 will be made apparent presently.

Assuming, now, that due to the application of the brakes, the speed of travel of the car reduces below sixty-five miles per hour. The speed relay 53 is correspondingly dropped-out and due to the opening of the contact member b of the relay 53, the circuit previously traced for energizing the magnet winding of the high magnet valve 64 of the speed-controlled valve mechanism 24 is interrupted and the magnet winding is deenergized. The magnet winding of the medium magnet valve 65 is accordingly the only one of the three magnet valves remaining energized. The relay valve section of the valve mechanism 24 is accordingly automatically operated to reduce the pressure in the pipe 68 to a value, which as previously assumed, is three-fourths of the pressure established in the control pipe. With sixty pounds per square inch fluid pressure established in the control pipe as previously assumed, the fluid pressure in the pipe 68 is accordingly reduced to approximately forty-five pounds per square inch. It will be understood that this reduction of pressure is not instantaneous but is controlled so as to take place in a given interval of time.

Upon the reduction of the fluid pressure in the pipe 68, as just described, the relay valve section 71 of each of the slip-controlled valve mechanisms 25 accordingly operates to reduce the pressure in the associated brake cylinders correspondingly, that is, to forty-five pounds per square inch, thereby correspondingly decreasing the degree of application of the brakes on all the wheels of the car.

When the speed of the car reduces in response to the continued application of the brakes to below forty miles per hour, the speed relay 52 is correspondingly dropped-out. The consequent opening of the contact member b of the relay 52 interrupts the circuit previously traced for energizing the magnet winding of the medium magnet valve 65 and the magnet winding is accordingly deenergized.

At this time, it will be seen that the magnet windings of all of the magnet valves 64, 65 and 66 of the speed-controlled valve mechanism 24 are deenergized. In such case, therefore, the relay valve section 61 of the valve mechanism 24 is operated to effect a further reduction of the fluid pressure in pipe 68 to a value previously assumed to be one-half the pressure established in the control pipe 18. With a pressure of sixty pounds per square inch established in the control pipe 18, as previously assumed, it will be seen that the deenergization of the magnet winding of the medium magnet valve 65 effected in response to the reduction of the speed of the car below forty miles per hour automatically effects a reduction in the pressure of the fluid supplied to the pipe 68 to one-half of sixty pounds per square inch or thirty pounds per square inch. The relay valve section 71 of the slip-controlled valve mechanism 25 accordingly responds to the reduction of the pressure in the pipe 68 to effect a corresponding reduction of the pressure in the brake cylinder to thirty pounds per square inch, thereby further decreasing the degree of application of the brakes.

When the speed of the car further reduces in response to the application of the brakes to below twenty miles per hour, the speed relay 51 is dropped-out. The contact member b of relay 51 is accordingly restored to its closed position to reestablish the circuit for energizing the magnet winding of the low magnet valve 66 of valve mechanism 24. In such case, therefore, with only the magnet winding of the low magnet valve 66 energized, the relay valve section 61 of the valve mechanism is operated to still further reduce the pressure in the pipe 68 to a value which is, as previously assumed, one-third of the pressure established in the control pipe 18. With the pressure of sixty pounds per square inch established in the control pipe, as previously assumed, the pressure in the pipe 68 is accordingly reduced to approximately twenty pounds per square inch.

The relay valve section 71 of each slip-controlled valve mechanism 25 accordingly responds to the reduction of the pressure in the pipe 68 to effect a corresponding reduction of the pressure in the associated brake cylinders to twenty pounds per square inch, thereby further decreasing the degree of application of the brakes.

As the speed of the car further reduces and until the car comes to a stop, the degree of application effected in response to the last described condition of the valve mechanism 24 remains in effect. It will be apparent, however, that if in accordance with the usual manner of operation the operator shifts the brake valve handle 22 back toward its release position so as to reduce the pressure in the control pipe 18 as the car approaches a stop, the pressure in the brake cylinders 16 is likewise correspondingly reduced. The ratio between the pressure in the brake cylinders 16 and the pressure established in the control pipe 18 is, however, at all times dependent upon the condition of the valve mechanism 24 as determined by the selective energization or deenergization of the magnet windings of the magnet valves 64, 65 and 66.

While the car is at a standstill, the degree of application of the brakes may be varied as desired by shifting the brake valve handle to different application positions. The ratio of the pressure in the brake cylinders 16 to the pressure in the control pipe 18 is, however, the lowest ratio because only the magnet winding of the low magnet valve 66 is energized while the car is stopped.

When the operator desires to again start the car he first releases the brakes by shifting the brake valve handle to its normal brake release position. The control pipe pressure is accordingly reduced to atmospheric pressure. Consequently, the fluid pressure supplied to the chamber at one side of the smallest diaphragm of the speed-controlled valve mechanism 24 from control pipe 18 correspondingly reduces with the pressure in the control pipe and the relay valve section 61 of the valve mechanism 24 operates to correspondingly reduce to atmospheric pressure the fluid supplied to the pressure chamber of the operating piston of the relay valve section 71 of the slip-controlled valve mechanisms 25. The relay valve section 71 of each valve mechanism 25 is likewise correspondingly operated to exhaust fluid under pressure from the associated brake cylinders 16 and thereby effect complete release of the brakes.

(c) Sanding operation

If the degree of application of the brakes effected is insufficient to cause the retardation of the car at a rate in excess of a certain value, such as four miles per hour per second, it is unlikely that slipping of the wheels will occur. As the rate of retardation of the car approaches four miles per hour per second, the likelihood that slipping of the wheels will occur is increased. If, therefore, during an application of the brakes, the car decelerates at a rate exceeding, for example, four miles per hour per second, a sanding operation of the equipment is automatically effected in the manner which will now be described.

Due to the rotative deceleration of the car wheels at a rate exceeding four miles per hour per second, the sanding relays 38, Fig. 1B, are substantially simultaneously picked-up and the contact members thereof correspondingly actuated to closed position. Since the contact members of the several sanding relays are arranged in parallel relation, as previously mentioned, it will be seen that the sanding relays are severally effective, depending upon which is first closed, to establish a circuit for energizing the lower winding 45b of the sanding control relay 45. This circuit extends from the positive terminal of the battery 81 by way of the wire 101, contact member d of the pressure switch 26 in its closed position, a bus wire 102, in parallel through the contact members of the several sanding relays 38 to a bus wire 103, magnet winding 45b of the relay 45, wires 104 and 105, and by the wire 86 back to the negative terminal of the battery 81.

The contact member of the sanding control relay 45 is accordingly operated to its closed position to establish a circuit for energizing the forward direction sanding magnet valve 30 for each wheel truck. This circuit extends from the positive terminal of the battery 81 by way of the wire 101, a branch wire 106, magnet winding of the forward sanding magnet valve 30 for the front wheel truck 11, a wire 107, contact member s of the reversing switch or relay 41 in its lower position shown, a wire 108, contact member of the sanding control relay 45, and wires 104, 105 and 86 back to the negative terminal of the battery 81. At the same time, the magnet winding of the forward sanding magnet valve 30 for the rear wheel truck 12 is energized by a circuit which extends from the positive terminal of the battery 81 by way of the wires 101 and 82, a branch wire 109, magnet winding of the forward sanding magnet valve 30 for the rear wheel truck 12, wire 107, contact member s of the reversing switch 41, wire 108, contact member of the sanding control relay 45, and wires 104, 105 and 86 back to the negative terminal of the battery 81.

The forward sanding magnet valves 30 for the front and rear wheel trucks are thus simultaneously operated to cut-off the charging communication for the associated sanding reservoirs 31 and establish communication through which fluid under pressure is supplied from each sanding reservoir 31 to the associated sanding devices 29f, which function in the usual manner to cause deposition of sand on the rails in advance of all of the car wheels on the car.

As previously indicated, the sanding devices 29f continue to cause deposition of sand for a certain maximum length of time dependent upon the time required for the pressure in the reservoir to exhaust through the sanding devices 29f. Thus, as long as the rate of retardation of the car remains in excess of four miles per hour per second, sanding of the rails continues for at least such certain length of time, such as ten or fifteen seconds. If however, due to the automatic reduction in the degree of application of the brakes effected by operation of the speed-controlled valve mechanism 24 in the manner previously described, the rate of deceleration of the car reduces below four miles per hour per second prior to the complete exhaust of fluid under pressure from the sanding reservoirs 31, the sanding operation is terminated before the expiration of the said certain length of time because of the interruption of the energizing circuits for the sanding magnet valves 30. It will be apparent that if the rate of deceleration of the car reduces below four miles per hour per second, all of the sanding relays 38 will be dropped-out and their contact members correspondingly opened to interrupt the energizing circuit for the magnet winding 45b of the sanding control relay 45, which accordingly drops-out. The contact member of the sanding control relay 45 is effective in its dropped-out or open position to interrupt the energizing circuits for the magnet windings of the sanding magnet valves 30.

Upon the deenergization of the magnet windings of the sanding magnet valves 30 for the front and rear wheel trucks, the charging communication for the corresponding sanding reservoirs 31 is accordingly reestablished so that the sanding reservoirs 31 are thus recharged. Accordingly, if the automatic sanding operation takes place at recurrent intervals during an application of the brakes, there is an adequate supply of fluid under pressure in the sanding reservoir 31 to cause sanding of the rails when automatic sanding is initiated or when sanding is initiated at the will of the operator, as will be presently described.

If the operator desires to cause sanding, as when starting the car or in an emergency, he may do so by closing the switch 46. When the switch 46 is closed, it establishes a circuit for energizing the upper magnet winding 45a of the sanding control relay 45. This circuit extends from the positive terminal of the battery 81 by way of the wire 101, a branch wire 111, switch 46, a wire 112, magnet winding 45a of the sanding control relay 45 and wire 86 back to the negative terminal of the battery 81.

The contact member of the sanding control relay 45 is accordingly actuated to its closed position in the same manner as for energization of the magnet winding 45b and sanding is accordingly effected in the same manner as previously described for the automatic sanding operation. It will be apparent as long as the operator maintains the switch 46 in its closed position, the magnet windings of the sanding magnet valves 30 corresponding to the direction of travel of the car will remain energized. Consequently, flow of fluid under pressure from the sanding reservoirs 31 to the sanding devices 29f (or 29r) will continue until such time as the supply of fluid under pressure in the reservoirs 31 is exhausted whereupon sanding will cease. Obviously, the operator may terminate the manual sanding operation at any time short of the maximum time by merely releasing the switch 46 and allowing it to return to its open position to effect deenergization of the magnet windings of the sanding magnet valves 30.

In the case of reverse travel of the car, the contact member s of the reversing switch 41 is in its upper position and, therefore, upon the pickup of the sanding control relay 45 due either to operation of the sanding relays 38 or to the operation of the manually operated switch 46, the magnet windings of the reverse direction sanding magnet valves 30 for the front and rear wheel trucks will be energized, instead of the forward direction sanding magnet valves. Since the magnet valves 30 for reverse travel of the car are connected in parallel with the magnet valves 30 for the forward direction of travel, subject to the control of contact member s of relay 41, the circuits for energizing the magnet valves 30 for reverse travel should not require specific description. Thus, for the reverse direction of car travel, the sanding devices 29r are effective to cause deposition of sand in advance of all of the car wheels.

(d) *Wheel-slip operation*

If, in spite of the automatic reduction in the degree of application of the brakes effected by valve mechanism 24 in response to the reduction in the speed of the car and in spite of the automatic sanding of the rails in the manner just described, one or more pairs of wheels on the car should begin to slip, a further operation of the equipment adapted to prevent sliding of the wheels occurs which will now be described.

Let it be assumed that while the car is traveling at a speed in excess of sixty-five miles per hour, the brakes are applied in the manner previously described and that the wheels on the trailing axle of the rear wheel truck 12 begin to slip. In such case, the sanding relay 38 and the slip relay 39 corresponding to such axle are sequentially picked-up and their contact members operated to the closed position thereof in close succession.

Due to the closing of the contact member of sanding relay 38, sanding is automatically effected in the manner previously described.

The closing of the contact member of the slip relay 39 establishes a circuit for energizing the magnet winding of the slip-control relay 48r so that the contact members a, b and c thereof are correspondingly actuated from their closed positions. The circuit for energizing the magnet winding of the relay 48r extends from the positive terminal of the battery 81 by way of the wire 101, contact member d of the pressure switch 26 in its closed position, bus wire 102, the contact member of the particular slip relay 39 operated, a wire 115, magnet winding of the relay 48r, a wire 116, and wire 86 back to the negative terminal of the battery 81.

The contact member a of the slip control relay 48r is effective when closed to establish a circuit for energizing the magnet winding of the magnet valve device 75 of the slip-controlled valve mechanism 25 for the rear wheel truck 12. This circuit extends from the positive terminal of the battery 81 by way of the wires 101 and 82, a branch wire 118, magnet winding of the magnet valve device 75, a wire 119, contact member a of the relay 48r, a wire 121, and wires 116 and 86 back to the negative terminal of the battery 81.

As previously explained, the energization of the magnet winding of the magnet valve device 75 of the valve mechanism 25 is effective to cut-off the supply of fluid under pressure from the pipe 68 to the pressure chamber at one side of the operating piston of the relay valve section 71 of the valve mechanism 25 and, at the same time, to establish an exhaust communication through which fluid under pressure is exhausted from the pressure chamber of the relay valve section 71. The relay valve section 71 of valve mechanism 25 is accordingly operated to effect a rapid reduction of the pressure in the brake cylinders 16. This reduction of the pressure in the brake cylinders 16 of the rear wheel truck is effected so rapidly that the slipping wheels on the trailing axle of the rear wheel truck cease to decelerate and begin to accelerate back toward a speed corresponding to car speed without attaining a locked or non-rotative condition and sliding.

When the rate of deceleration of the slipping wheels reduces below ten miles per hour per second, which rate was exceeded when the wheels began to slip, the contact member of the slip relay 39 corresponding thereto is returned to its open position. The magnet winding of the slip control relay 48r is not, however, deenergized in response to the opening of the contact member of the slip relay 39 because of a previously established holding circuit therefor. This holding circuit was established by the contact member b of the relay 48r when the relay was first picked-up and extends from the positive terminal of the battery 81 by way of the wires 101, 82 and 118, pressure switch 27 associated with the brake cylinders 16 of the rear wheel truck, a wire 123, contact member b of the relay 48r, a wire 124, wire 115, magnet winding of the relay 48r, and wires 116 and 86 back to the negative terminal of the battery 81.

It will thus be apparent that until the pressure switch 27 opens as the result of the reduction of the pressure in the brake cylinders 16 for the rear wheel truck 12 to a value below ten pounds per square inch, the magnet valve device 75 remains effective to continue the reduction of pressure in the brake cylinders 16.

When the pressure in the brake cylinders 16 for the rear wheel truck 12 reduces below ten pounds per square inch and the pressure switch 27 is correspondingly opened, the holding circuit for the magnet winding of the relay 48r is interrupted and the relay is correspondingly dropped-out. The circuit for energizing the magnet winding of the magnet valve device 75 of the valve mechanism 25 of the rear wheel truck 12 is thus also interrupted because of the opening of the contact member a of the relay 48r. As a result, the exhaust of fluid under pressure from the pressure chamber of the relay valve section 71 of the valve mechanism 25 is terminated and the resupply of fluid under pressure thereto at a restricted rate is initiated. The relay valve section 71 thus correspondingly operates to resupply fluid under pressure to the brake cylinders 16 of the rear wheel truck at a restricted rate.

The time required for the pressure in the brake cylinders 16 of the rear wheel truck to reduce sufficiently to cause opening of the corresponding pressure switch 27 is longer than the time required for the slipping wheels to return to a speed corresponding to vehicle speed and, therefore, the resupply of fluid under pressure to the brake cylinders 16 for the rear wheel truck and the consequent reapplication of the brakes is not initiated until after the slipping wheels have returned fully to a speed corresponding to vehicle speed, thereby minimizing the possibility of recurrent wheel slipping. At the same time, the fact that the brakes are reapplied at a restricted rate of build-up further minimizes the possibility of recurrent wheel slipping.

It will be recalled that it was assumed that the car was traveling at a speed in excess of sixty-five miles per hour at the time that the slipping of the wheels on the trailing axle of the rear wheel truck began to slip. Due to the reduction of speed of rotation of the wheels on the trailing axle of the rear wheel truck 12, the voltage across the brush terminals of the corresponding generator 35 is correspondingly reduced and thus becomes insufficient to so energize the pick-up winding 53a of the speed relays 53 as to maintain the relay 53 picked-up.

Unless prevented from so doing, in accordance with my present invention, the valve mechanism 24 will of course automatically operate in response to the drop-out of relay 53 to reduce the pressure supplied through the pipe 68 to operate the relay valve section 71 of the valve mechanisms 25, which in turn will result in the automatic reduction of the pressure in all the brake cylinders on the car.

In accordance with my invention, I therefore provide an arrangement for preventing the drop-out of the speed relay 53, and also the relays 52 and 51, if these relays tend to drop out due to the slipping of the wheels associated with the corresponding axles.

In the case of the speed relay 53, the drop-out thereof in response to the slipping of the wheels of the trailing axle of the rear wheel truck is prevented by establishing a holding circuit for energizing the lower or holding winding 53b of the speed relay 53 when the slip control relay 48r is initially picked-up. This holding circuit for the relay 53 extends from the positive terminal of the battery 81 by way of the wires 101 and 82, a branch wire 126, contact member a of the speed relay 53, a wire 127, holding winding 53d of the relay 53, wires 128 and 129, contact member c of the slip control relay 48r, a wire 131, and wires 116 and 86 back to the negative terminal of the battery 81.

It will thus be apparent that if the speed relay 53 is picked-up, and only if it is picked-up, the holding circuit including the holding winding 53b thereof is established upon the pick-up of the relay 48r so as to maintain the speed relay 53 picked-up thereafter as long as the relay 48r remains picked-up. Since the slip control relay 48r remains picked-up, as previously described, until after the slipping wheels return to a speed corresponding to car speed, it will be seen that the speed relay 53 is maintained picked-up, notwithstanding the momentary reduction in the rotative speed of the corresponding wheels due to slipping. Thus, the undesired deenergization of the magnet winding of the high magnet valve 64 of the magnet valve 24 is prevented. Accordingly, the degree of application of the brakes associated with the front wheel truck 11 is not reduced as a result of the slipping of wheels on the rear wheel truck.

If the car is still traveling in excess of sixty-five miles per hour at the time that the slip control relay 48r is dropped-out, the pick-up coil 53a of the speed relay 53 will be effective to maintain the contact members of the relay picked-up because the slipping wheels will have previously returned to a speed corresponding to car speed.

If the speed of the car has reduced to below sixty-five miles per hour at the time that the slip control relay 48r is dropped-out, the interruption of the holding circuit for the holding winding 53b of the relay 53 then results in the drop-out of the speed relay 53. Thus, the speed relay 53 cannot drop-out until the speed of the car has reduced to below sixty-five miles per hour, in which case it is intended to drop-out.

A similar arrangement to that just described for the relay 53 is provided for the speed relays 51 and 52 to prevent the undesired drop-out thereof in response to the slipping of the wheels on the corresponding axle. Thus, if the wheels on the leading axle of the rear wheel truck 12 should begin to slip while the car is traveling at a speed in excess of forty miles per hour, a circuit for energizing the holding winding 52b of the relay 52 is established. The holding circuit for the speed relay 52 extends from the positive terminal of the battery 81, by way of the wires 101, 82 and 126, the contact member a of the relay 52, a wire 133, holding winding 52b of the relay 52, wire 129, contact member c of the relay 48r, which is picked-up in response to the operation of the slip relay 39 corresponding to the leading axle of the rear wheel truck, and wires 131, 116 and 86 back to the negative terminal of the battery 81. Thus, the relay 52 is prevented from dropping-out to effect the undesired deenergization of the magnet winding of the medium magnet valve 65 of the speed-controlled valve mechanism 24 unless and until the speed of the car reduces below forty miles per hour.

In a similar manner, the undesired drop-out of the relay 51 in response to the slipping of the wheels on the trailing axle of the front wheel truck 11 is prevented. It will be apparent that the slip control relay 48f will be picked-up when the slip relay 39 corresponding to the trailing axle of the front wheel truck is operated in response to the slipping of the wheels of this axle. The circuit for energizing the relay 48f extends from the positive terminal of the battery 81 through the wire 101, and contact member d of the pressure switch 26 in its closed position to the bus wire 202, then by way of the contact member of the slip relay 39 involved, a wire 136, magnet winding of the slip control relay 48f, a wire 137, and the wires 85 and 86 back to the negative terminal of the battery 81.

Upon the pick-up of relay 48f, the contact members a and b thereof operate respectively to establish a circuit for energizing the magnet winding of magnet valve 75 of the slip-controlled valve mechanism for the front wheel truck 11, and the holding circuit for maintaining the relay 48f picked-up subject to the opening of the corresponding pressure switch 27. The wires involved in these circuits are designated by reference numerals corresponding to those identifying similar wires associated with slip control relay 48r and the pressure switch 27 for the rear wheel truck and accordingly specific tracing of the circuits is deemed unnecessary.

The circuit for energizing the holding winding 51b of the relay 51 extends from the positive terminal of the battery 81 by way of the wire 101, a branch wire 138, holding winding 51b, a wire 139, contact member c of relay 48f in closed position, a wire 141, contact member b of the speed relay 51 in its upper or picked-up position, and wires 85 and 86 back to the negative terminal of the battery 81. Thus, notwithstanding that the wheels on the trailing axle of the front wheel truck 11 reduce to below a rotative speed corresponding to twenty miles per hour while slipping, the speed relay 51 is not dropped-out. Consequently, the magnet winding of the low magnet valve 66 remains deenergized.

It will thus be seen that, whenever the wheels of either axle of a particular wheel truck slip, the brakes associated with the wheels of both axles of that truck are automatically and rapidly released. It is to be noted, however, that by reason of the arrangement I have provided for preventing the undesired drop-out of the speed relays 51, 52 and 53, the slipping of the wheels on one wheel truck is not effective to vary the condition of the speed-controlled valve mechanism 24 in a manner to effect even a momentary reduction in the degree of application of the brakes on the other wheel truck having no slipping wheel.

The operation of the equipment is exactly the same as that previously described for the forward direction of travel in the event that the car travels in the reverse direction and therefore requires no specific explanation or description. Suffice it to say, the automatic operation of the contact members a and b of the reversing switch 41 to the opposite or reverse position thereof automatically results upon the starting of the car in the reverse direction of the travel.

(e) *Effect of failure of generators 35*

It will be apparent that if any of the axle-driven generators 35 should for some reason, such as a short-circuit or ground in the armature winding, or other cause, fail to produce or generate a voltage in the normal manner, the sanding relay 38, the slip relay 39, and the speed relay 51, 52 and 53 corresponding thereto will fail to operate, that is pick-up. In the case of the sanding relay 38 and the slip relay 39, the failure of the generator 35 obviously results in a failure to effect sanding and a failure to effect the proper automatic reduction in brake cylinder pressure.

In the case of the speed relays 51, 52 or 53, the failure of the generator merely alters the character of the operation of the speed-controlled valve mechanism 24 in response to variations in the speed of the car but does not render the valve mechanism 24 completely inoperative. Thus, for example, if the speed relay 53 fails to pick-up due to failure of the corresponding generator 35, it will be apparent that the speed-controlled valve mechanism 24 will operate but will be effective to establish only the next to the highest ratio between the brake cylinder pressure and the control pipe instead of the highest ratio.

If the speed relay 52 fails to pick-up due to failure of the corresponding generator, the speed-controlled valve mechanism 24 will be effective, due to the unconnected relation of the diaphragms thereof, to establish the highest ratio between the pressure in the brake cylinders and that in the control pipe as long as the speed of the car is in excess of sixty-five miles per hour. When the speed of the car reduces below sixty-five miles per hour, however, instead of reducing to the next lower ratio, the brake cylinder pressure will be reduced to the second lower ratio. Using the illustrative figures previously employed, it will be seen that the ratio of the pressure in the brake cylinders to the pressure in the control pipe 18 will be reduced from a pressure equal to that in the control pipe at speeds above sixty-five miles per hour to a pressure which is one-half the pressure in the control pipe, instead of three-fourths of the pressure in the control pipe.

In a similar manner if the speed relay 51 should fail to pick-up due to failure of its corresponding generator, it will be seen that when the speed of the car reduces below forty miles per hour the brake cylinder pressure will be reduced to one-third of the pressure in the control pipe instead of to one-half of the pressure.

It will accordingly be seen that by controlling the magnet valves 64, 65 and 66 of the speed-controlled valve mechanism 24 individually by different axle-driven generators 35, the effect on the valve mechanism 24 is minimized. The arrangement provided in the first embodiment, therefore, possesses certain advantages over an embodiment later to be described in which the magnet valves 64, 65 and 66 of the valve mechanism 24 are controlled in accordance with the voltage supplied from a single axle-driven generator 35.

It will be understood, in addition, that since the brake and sanding control equipment for each car in a train of cars is independent of the brake and sanding control equipment on other cars, with the exception of the manual control of the brakes through control pipe 18, that the failure of a single generator on a car will have a negligible effect as far as the operation of the brakes on the train as a whole is concerned. It is believed desirable, however, to point out such results as would occur in the event of the failure of one of the generators 35, in order to make this fact apparent.

*Description of embodiment shown in Fig. 2*

Referring to Fig. 2, there is shown a fragment of the equipment shown in Figs. 1A and 1B in which certain modifications are made in the embodiment previously described. For simplicity, corresponding parts and wires of the two embodiments will be designated by the same reference numerals without further description and only those parts provided in Fig. 2 which are not provided in the previous embodiment will be described briefly in connection with the basic parts of the equipment.

Instead of providing a reversing switch device of the polarized relay type, such as the relay 41 of the first embodiment, and controlling the energizing circuit of the relay winding by a back-contact of the speed relay 51 as in the first embodiment, there is provided in Fig. 2 a reversing switch device 151 in the form of a multi-contact relay of the neutral type to perform the functions previously performed by the relay 41 of the first embodiment. The energizing circuit of the winding of the relay 151 is, moreover, controlled according to the position of a single contact of a polarized relay 152, the winding of which is connected across the brush terminals of the generator 35 associated with the leading axle of the front wheel truck 11.

In addition there is provided in the embodiment of Fig. 2 a so-called voltage responsive or speed relay 153, having a winding controlled in accordance with the voltage across the brush terminals of one of the axle-driven generators 35, and two movable contact members a and b respectively.

The relay 151 is provided with four pairs of reversing contact members, the contact fingers of each pair being designated a and b respectively as in the case of the relay 41 of the first embodiment. In addition the relay 151 is provided with a contact designated s corresponding in function to the contact member s of the relay 41.

The winding of the polarized relay 152 is connected across the brush terminals of the generator 35 associated with the leading axle of the front wheel truck 11 by a circuit which includes the contact member a of the voltage-responsive relay 153.

The winding of the voltage-responsive relay 153 is connected in parallel relation to the series-connected condenser 37, sanding relay 38, and slip relay 39 in the circuit of the generator corresponding to the leading axle of the front wheel truck, and is therefore connected to the brush terminals of the generator through a pair of the contact members a and b of the reversing switch 151 so as to be energized by a uni-directional current nothwithstanding the reversal of polarity of the generator due to reverse travel of the car. The winding of the voltage-responsive relay 153 is moreover, so designed that when the voltage across the brush terminals of the generator 35 associated with the leading axle of the front wheel truck exceeds a value corresponding for example to that occurring at a car speed of ten miles per hour, the contact members a and b thereof are actuated from the position in which they are shown to the opposite position thereof.

In its opposite position, the contact member a of the relay 153 interrupts the circuit for energizing the winding of the polarized relay 152, thereby disconnecting the winding of the relay 152 from the brush terminals of the generator 35 and preventing overloading of the generator, due to the current load of the winding of the relay 152, particularly at high speeds. The contact member b of the speed-responsive relay 153 is adapted in its opposite position to close the circuit through the wire 108 connecting the contact member s of the reversing switch 151 to the contact finger of the sanding control relay 45.

It will thus be apparent that unless the speed of the car exceeds ten miles per hour so that the contact member b of the relay 153 is in its closed position, the energization of either of the operating windings 45a or 45b of the sanding control relay 45 is ineffective to cause sanding.

It is thought desirable to provide an arrangement of this kind for preventing sanding at speeds below a certain low speed, such as ten miles per hour, in order to prevent the possible accumulation of sand on the rails to such an extent as to interfere with track shunting devices, employed in certain types of service, for controlling and operating track circuit controlled signals.

The arrangement of the winding of the polarized relay 152 is such that when the car is traveling in a forward direction, the flow of current through the winding of the relay is in such a direction as to maintain the single contact member of the relay in its open position as shown. On the other hand, when the car is traveling in a reverse direction, and the flow of current through the winding of the relay 152 is correspondingly reversed, the contact member of the relay 152 is actuated to its closed position, thereby establishing a circuit for energizing the magnet winding of the reversing switch 151. The circuit for energizing the winding of the relay 152 extends from the positive terminal of the battery 81, see Fig. 1A by way of the wire 101 and branch wire 106, a second branch wire 155, the contact member of the relay 152 in its closed position, a wire 156, magnet winding of the reversing switch or relay 151 and back to the negative terminal of the battery 81 by way of the wire 85, a portion of which is indicated in Fig. 2.

When the magnet winding of the reversing switch 151 is deenergized, the various contact members thereof are biased into the position in which they are shown in Fig. 2. When the magnet winding of the reversing switch 151 is energized, the contact members of the relay 151 are actuated to their opposite or left-hand positions, thereby reversing the connections to the brush terminals of the corresponding generators 35.

It should be understood that the polarized relay 152 is of such nature that when the contact member thereof is actuated to a certain position it remains thereafter in such position until the direction of flow of current through the winding thereof is reversed from that last flowing therethrough. Thus, when the winding of the polarized relay 152 is deenergized in response to the opening of the energizing circuit by contact member a of the relay 153, the contact member of the polarized relay 152 does not change in position but remains in the position to which it was last actuated.

In view of the fact that the operation of the equipment shown in Fig. 2 is identical to that of the previously described embodiment, except in the respects just noted, it is deemed unnecessary to further describe the embodiment or its operation.

DESCRIPTION OF EMBODIMENT SHOWN IN FIG. 3

In Fig. 3, there is shown fragmentally a modification of the first described embodiment, in which the speed relays 51, 52 and 53 have their pick-up coils 51a, 52a and 53a connected in series relation across the brush terminals of a single generator 35 associated with one of the axles of the car, instead of being separately energized by three different generators associated with different axles, as in the first described embodiment.

For simplicity, only one pair of the reversing contact members a and b of the relay 41 are shown in Fig. 3 but it should be understood that the additional pairs of contact members a and b, as well as the contact member s are provided in the same manner as in the first embodiment.

It should be understood also that the pick-up windings 51a, 52a and 53a of the speed relays in Fig. 3 are so designed as to cause pick-up of the contact members of the relays in the same manner as do the corresponding windings of relays 51, 52 and 53 of the first embodiment. In other words, the contact members of relay 51 are picked up when the energizing current through the pick-up coil 51a thereof exceeds a value corresponding to a car speed of twenty miles per hour. Also, it should be understood that the contact members of the relay 52 are picked-up when the current through the pick-up coil 52a thereof is energized by a current exceeding a certain value corresponding to a car speed of forty miles per hour. Also, it should be understood that the contact members of the relay 53 are picked-up when the current energizing the pick-up coil 53a thereof exceeds a value corresponding to a car speed of sixty-five miles per hour.

In the same manner as the relays 51, 52 and 53 of the first embodiment, the corresponding relays of Fig. 3 are provided with holding coils 51b, 52b and 53b respectively. The circuits for energizing the holding coils, just mentioned, varies from that of the first embodiment and will now be described, although the same principle applies as in the first embodiment. In Fig. 3, the three holding coils 51b, 52b and 53b are connected in parallel relation between the wire 101 connected to the positive terminal of the battery 81 and a wire 161 that is connected to the contact member c of the slip control relay 48f. The branch circuit for the holding coil of each relay includes a self-holding contact member a of the corresponding relay. Whenever the wheels 13, driving the generator 35 that energizes the pick-up coils of the relays 51, 52 and 53, slip, the slip control relay 48f is energized and the contact members a, b and c picked-up just as in the first embodiment. When the contact member c of the relay 48f is actuated to its picked-up position it closes a circuit connecting the wire 161 to the wire 86 leading to the negative terminal of the battery 81.

It will thus be apparent that if any one of the relays 51, 52 and 53 is picked up at the time slipping of the wheel 13 of the corresponding generator 35 occurs, the holding circuit for energizing the holding coils of the corresponding relay is established, thereby preventing the undesired drop-out of the relay.

The contact member b of each of the relays 52 and 53 of Fig. 3 functions in exactly the same manner as in the first described embodiment and accordingly needs no description. For convenience, the relay 51 in Fig. 3 is provided with two back-contact members b and c respectively.

The back-contact member b serves to control the energizing circuit for the magnet winding of the low magnet valve 66 of the speed-controlled valve mechanism 24 in exactly the same manner as in the first embodiment. The back-contact member c serves to control the energizing circuit for the magnet winding of the relay 41 in exactly the same manner as does the back-contact member a of the speed relay 51 of the first embodiment.

In order to cause the speed relays 51, 52 and 53 of Fig. 3 to drop-out at substantially the same car speed at which they were picked-up, an arrangement similar to that provided in the first embodiment is also provided in Fig. 3. This arrangement includes a pressure switch 26a which differs from the pressure switch 26 of the first embodiment in having but one back-contact member x instead of the three back-contact members a, b, and c of the pressure switch 26.

The pressure switch 26a is controlled in accordance with the pressure in the control pipe 18 through the branch pipe 56 in the same manner as in the first embodiment.

When the pressure in the control pipe 18 exceeds five pounds per square inch, the contact members d and x of the pressure switch 26a are actuated to their closed and open positions respectively. The contact member d functions in exactly the same manner as does the contact member d of the pressure switch 26. The contact member x is adapted when shifted to open position to interrupt the shunt connection around a resistor 54a arranged in series-circuit relation with the pick-up coils of the relays 51, 52 and 53.

An additional resistor 165 is also provided in series-circuit relation with the pick-up coils of the relays 51, 52 and 53. The resistor 165 is provided for the purpose of adjusting the current in the circuit of the pick-up coils of the relays 51, 52 and 53 to the proper value in correspondence with the speed of the car to cause pick-up of the relays at the various speeds selected.

It should be understood that only so much of the embodiment is shown in Fig. 3 as is deemed necessary to point out the differences thereof with respect to the first described embodiment, and that the complete equipment corresponds for the most part with the first described embodiment except as modified in the manner as shown in Fig. 3.

In view of the above explanation as to the operation of the embodiment shown in Fig. 3 and the above detailed description of the first described embodiment, it is believed unnecessary to further describe the equipment shown in Fig. 3 and the operation thereof.

Summary

Summarizing, it will be seen that I have disclosed several embodiments of my invention relating to brake and sanding control equipment for vehicles, such as railway cars and trains. In all of the embodiments a generator of the direct-current type is provided for each axle or pair of connected wheels and is arranged to generate a voltage substantially proportional to the rotative speed of the associated wheels. In all of the embodiments there are provided on each car a speed-controlled valve mechanism and a plurality of slip-controlled valve mechanism, one of the latter being provided for each wheel truck of the car.

In all of the embodiments, the slip-controlled valve mechanisms are adapted to be operated to effect a rapid decrease in brake cylinder pressure in response to the slipping of the wheels on the corresponding wheel truck as measured by the rate of change of voltage of the corresponding axle-driven generator.

The speed-controlled valve mechanism in the various embodiments is controlled automatically through a plurality of voltage-responsive relays that are in turn operatively controlled in accordance with the voltage of one or more of the axle-driven generators and is effective to cause a plurality of successive reductions in the degree of application of the brakes as the speed of the car reduces.

A particular feature of my invention is the provision of a holding circuit for the voltage-responsive relays controlling the speed controlled valve mechanism, which circuit is established whenever any of the wheels slip, for preventing a change in the condition of the relays. Operation of the speed-controlled valve mechanism to effect an undesired reduction in the degree of application of the brakes on the car in response to slipping of any of the wheels is therefore prevented.

In all of the embodiments there is also provided a novel arrangement for automatically effecting sanding of the track rails or road surface in advance of the wheels for opposite directions of travel whenever the rate of rotative deceleration of one or more or all of the vehicle wheels exceeds a certain rate, such as four miles per hour per second. This arrangement includes a two-coil sanding control relay adapted to effect sanding upon energization of either of the coils or windings. One of the coils is arranged to be energized whenever the rate of rotative deceleration of any of the car wheels exceeds the certain rate such as four miles per hour per second. The other of the coils is arranged to be energized in response to operation of a manually operated device located in the control cab of the car.

It will thus be seen that the novel arrangement provided enables both automatic and manual control of sanding in a simple and effective manner. This feature of my invention is claimed in my copending application, Serial No. 357,675, filed September 21, 1940, which application is a continuation-in-part of the present application.

In one of the embodiments, the sanding control equipment includes a relay responsive to the voltage at the terminals of one of the axle-driven generators which is effective to interrupt the energizing circuit for the sanding magnet valves controlled by the two-coil sanding control relay so as to prevent sanding whenever and as long as the speed of the car is less than a certain low speed such as ten miles per hour.

While I have shown and described only several embodiments of my invention, it will be apparent that various omissions, additions, or modifications may be made in the embodiments shown without departing from the spirit of my invention.

Having now described my invention, what I claim as new and desire to secure by Letters Patent, is:

1. Brake control apparatus for a wheeled vehicle comprising, in combination, means for causing application and release of the brakes associated with the vehicle wheels, means controlled according to the rotative speed of a given wheel operative during an application of the brakes to cause a reduction in the degree of application of the brakes associated with all wheels of the vehicle upon reduction in the speed of the vehicle, and means effective in response to the slipping of the said given wheel for preventing operation of the speed-controlled means to vary the degree of application of the brakes notwithstanding the reduction in the rotative speed of the given wheel while slipping.

2. Brake control apparatus for a wheeled vehicle comprising, in combination, means for causing application and release of the brakes associated with the vehicle wheels, means controlled according to the rotative speed of a given wheel operative during an application of the brakes to cause a reduction in the degree of application of the brakes associated with all wheels of the vehicle upon reduction in the speed of the vehicle, and means operative in response to the slipping of the said given wheel and effective at least as long as the said given wheel slips for preventing the operation of the speed-controlled means to vary the degree of application of the brakes notwithstanding the reduction in the rotative speed of the given wheel while slipping.

3. Brake control apparatus for a wheeled vehicle comprising, in combination, means for causing application and release of the brakes associated with the vehicle wheels, means controlled according to the rotative speed of a given wheel operative during an application of the brakes to cause a reduction in the degree of application of the brakes associated with all wheels of the vehicle upon reduction in the speed of the vehicle, and means operative in response to the slipping of the said given wheel and effective for a limited time to prevent the operation of the speed-controlled means to vary the degree of application of the brakes notwithstanding the reduction in the rotative speed of the given wheel while slipping.

4. Brake control apparatus for a wheeled vehicle comprising, in combination, means for causing application and release of the brakes associated with the vehicle wheels, means controlled according to the rotative speed of a given wheel and operative during an application of the brakes to cause a reduction in the degree of application of the brakes associated with all wheels of the vehicle in response to a reduction in the speed of the vehicle, means controlled according to the rate of reduction of rotative speed of the said given wheel and operative when the given wheel decelerates rotatively at a rate exceeding a certain rate to cause a reduction in the degree of application associated with only certain wheels including the given wheel, and means effective upon operation of the rate-controlled means for preventing operation of the speed-controlled means to vary the degree of application of the brakes on any of the vehicle wheels notwithstanding the reduction in the rotative speed of the given wheel.

5. Brake control apparatus for a wheeled vehicle comprising, in combination, means for causing application and release of the brakes associated with the vehicle wheels, means controlled according to the rotative speed of a given wheel and operative during an application of the brakes to cause a reduction in the degree of application of the brakes associated with all wheels of the vehicle in response to a reduction in the speed of the vehicle, means controlled according to the rate of reduction of rotative speed of the said given wheel and operative when the given wheel decelerates rotatively at a rate exceeding a certain rate to cause a reduction in the degree of application associated with only certain wheels including the given wheel, and means effective upon operation of the rate-controlled means and for a limited time thereafter for preventing the operation of the speed-controlled means to vary the degree of application of the brakes on any of the vehicle wheels notwithstanding the reduction in the rotative speed of the given wheel.

6. Brake control apparatus for a wheeled vehicle comprising, in combination, means for causing application and release of the brakes associated with the vehicle wheels, means controlled according to the rotative speed of a given wheel and operative during an application of the brakes to automatically vary the degree of application of the brakes associated with all wheels of the vehicle dependent upon the rotative speed of the given wheel, means operatively responsive only to the slipping of said given wheel, and means controlled by the wheel-slip responsive means adapted, upon operation of the wheel-slip responsive means, to prevent operation of the speed-controlled means to vary the degree of application of the brakes on any of the vehicle wheels notwithstanding the reduction in the rotative speed of the given wheel while slipping.

7. Brake control apparatus for a wheeled vehicle, comprising, in combination, means for causing application and release of the brakes associated with the vehicle wheels, means controlled according to the rotative speed of a given wheel and operative during an application of the brakes to automatically vary the degree of application of the brakes associated with all wheels of a vehicle dependent upon the rotative speed of the given wheel, means operatively responsive only to the slipping of the said given wheel for effecting a rapid reduction in the degree of application of the brakes on certain wheels including the given wheel to prevent sliding of the given wheel, and means controlled by the wheel-slip responsive means for preventing operation of the speed-controlled means tending to vary the degree of application of the brakes on any of the vehicle wheels in response to the reduction in the rotative speed of the given wheel while slipping.

8. Brake control apparatus for a wheeled vehicle comprising, in combination, means for causing application and release of the brakes associated with the vehicle wheels, means controlled according to the rotative speed of a given wheel and operative during an application of the brakes to automatically vary the degree of application of the brakes associated with all wheels of the vehicle dependent upon the rotative speed of the given wheel, means operatively responsive only to slipping of the given wheel for initiating a rapid reduction in the degree of application of the brakes associated with certain wheels including the given wheel to prevent sliding of the given wheel, means controlled in accordance with the degree of application of the brakes for terminating the reduction in the degree of application of the brakes effected in response to operation of said wheel-slip responsive means when the degree of application of the brakes is reduced below a certain value, and means responsive to the operation of the wheel-slip responsive means and effective as long as the degree of application of the brakes is reducing in response to the operation of the wheel-slip responsive means for preventing operation of the speed-controlled means to vary the degree of application of the brakes on any of the vehicle wheels as a result of the reduction in the rotative speed of the given wheel while slipping.

9. Brake control apparatus for a wheeled vehicle comprising, in combination, means for causing application and release of the brakes associated with the vehicle wheel, means for supplying a direct-current voltage substantially proportional to the rotative speed of a given wheel, a voltage-responsive relay operatively responsive to variations of the voltage supplied by the voltage supply means from one side to the other of a certain critical voltage corresponding to a certain vehicle speed, valve means controlled by said voltage-responsive means for varying the degree of application of the brakes established by the first said means, and means operative in response to the slipping of the said given wheel for preventing an operative response of said voltage-responsive means to the variation of the voltage supplied by the voltage supply means and the consequent operation of the valve means to vary the degree of application of the brakes while the given wheel slips.

10. Brake control apparatus for a wheeled vehicle comprising, in combination, means for causing application and release of the brakes associated with the vehicle wheels, means for supplying a direct-current voltage substantially proportional to the rotative speed of a given wheel, voltage-responsive means operatively responsive to the variation of the voltage supplied by the voltage supply means from one side to the other of a certain critical voltage corresponding to a certain vehicle speed, valve means controlled by the voltage-responsive means in a manner to cause one degree of application of the brakes to be effected when the voltage supplied by the voltage supply means is above the critical value and a different degree of application of the brakes to be established when the voltage supplied by the voltage supply means is below said critical value, means operatively responsive only to the slipping of the said given wheel, means controlled by the wheel-slip responsive means and effective in response to the slipping of the given wheel for preventing for a limited time the operative response of the voltage-responsive means to the variation of the voltage supplied by the voltage supply means in response to the reduction in the rotative speed of the given wheel while slipping, and means controlled by the wheel-slip responsive means and operative, when the said given wheel slips, to initiate a rapid reduction in the degree of application of the brakes associated with certain of the wheels including said given wheel and then cause an increase in the degree of application of the brakes on the said certain wheels.

11. Brake control apparatus for a wheeled vehicle comprising, in combination, manually controlled means for causing application and release of the brakes associated with the vehicle wheels, means for supplying a voltage substantially proportional to the rotative speed of a given vehicle wheel, a voltage-responsive relay having a plurality of separate windings, one of said windings being energized in accordance with the voltage supplied by said voltage supply means and adapted to cause the relay to be picked-up or dropped-out depending upon the voltage supplied by the voltage supply means being above or below, respectively, a certain critical voltage corresponding to a certain vehicle speed, valve means controlled by the voltage-responsive means and effective when the voltage-responsive relay is picked-up to cause a certain degree of application of the brakes to be established and when the voltage-responsive relay is dropped-out to cause a different degree of application of the brakes to be established, and means operatively responsive to the slipping of the given wheel for causing another of the windings of said voltage-responsive relay to be energized to prevent the drop-out of the relay in response to the reduction of the voltage supplied by the voltage supply means when the given wheel slips.

12. Brake control apparatus for a wheeled vehicle comprising, in combination, means for causing application and release of the brakes associated with the vehicle wheels, means for supplying a direct-current voltage substantially proportional to the rotative speed of a given wheel, means operatively responsive only to the change in the voltage supplied by said voltage supply means at a rate exceeding a certain rate when the said given wheel slips, means controlled by the last said means for effecting a rapid reduction in the degree of application of the brakes on certain wheels including the given wheel to prevent sliding of the given wheel, voltage-responsive means operatively responsive to the variation of the voltage supplied by said voltage supply means from one side to the other of a certain critical value corresponding to a certain vehicle speed, means controlled by the said voltage-responsive means for effecting a predetermined uniform percentage of reduction in the degree of application of the brakes on all wheels when the speed of the vehicle reduces below said certain critical value, and means effective in response to the operation to the wheel-slip responsive means for preventing operation of the said voltage-responsive means in response to the reduction of voltage supplied by said voltage supply means from above to below said critical value while said given wheel slips so as to prevent the operation of the means controlled by the voltage-responsive means to vary the degree of application of the brakes on any of the vehicle wheels in response to the slipping of the said given wheel.

13. Brake control apparatus for a wheeled vehicle comprising, in combination, manually controlled means for causing application and release of the brakes associated with the vehicle wheels, means for supplying a direct-current voltage substantially proportional to the rotative speed of a given wheel and therefore according to the speed of the vehicle, means operatively responsive only to a change in the voltage supplied by said voltage supply means at a rate exceeding a certain rate and occurring when the said given wheel slips, a relay controlled by the said wheel-slip responsive means and adapted to be picked-up in response to the operation thereof when the given wheel begins to slip, valve mechanism controlled by said relay and operatively responsive to the pick-up of the relay for effecting a rapid reduction in the degree of application of the brakes on certain wheels including said given wheel when the given wheel slips to prevent sliding thereof, a voltage-responsive relay having two separate electromagnet windings, one of which is controlled according to the voltage supplied by the voltage supply means and effective to cause pick-up of the voltage-responsive relay only when the voltage supplied exceeds a certain critical value corresponding to a certain critical speed of the vehicle and the other of said windings being effective when energized to hold the said relay picked-up, valve means controlled by said voltage-responsive relay and effective in response to pick-up of the relay to cause a certain degree of application of the brakes to be established upon operation of the manually controlled means and adapted to effect a predetermined percentage of reduction in the degree of application of the brakes from said certain degree in response to the drop-out of said voltage-responsive relay, and a holding circuit for energizing the holding winding of said voltage-responsive relay adapted to be completed in response to pick-up of the relay controlled by said wheel-slip responsive means so as to cause the holding winding to prevent the drop-out of the voltage-responsive relay in response to the reduction of the voltage supplied by the voltage supply means below said critical value while said given wheel is slipping.

14. Brake control apparatus for a wheeled vehicle comprising, in combination, manually controlled means for causing application and release of the brakes associated with the vehicle wheels, means for supplying a direct-current voltage substantially proportional to the rotative speed of a given wheel and therefore according to the speed of the vehicle, means operatively responsive only to a change in the voltage supplied by said voltage supply means at a rate exceeding a certain rate and occurring when the said given wheel slips, a relay controlled by the said wheel-slip responsive means and adapted to be picked-up in response to the operation thereof when the given wheel begins to slip, valve mechanism controlled by said relay and operatively responsive to the pick-up of the relay for effecting a rapid reduction in the degree of application of the brakes on certain wheels including said given wheel when the given wheel slips to prevent sliding thereof, a voltage-responsive relay having two separate electromagnet windings, one of which is controlled according to the voltage supplied by the voltage supply means and effective to cause pick-up of the voltage-responsive relay only when the voltage supplied exceeds a certain critical value corresponding to a certain critical speed of the vehicle and the other of said windings being effective when energized to hold the said relay picked-up, valve means controlled by said voltage-responsive relay and effective in response to pick-up of the relay to cause a certain degree of application of the brakes to be established upon operation of the manually controlled means and adapted to effect a predetermined percentage of reduction in the degree of application of the brakes from said certain degree in response to the drop-out of said voltage-responsive relay, a holding circuit for energizing the holding winding of said voltage-responsive relay adapted to be completed in response to pick-up of the relay controlled by said wheel-slip responsive means so as to cause the holding winding to prevent the drop-out of the voltage-responsive relay in response to the reduction of the voltage supplied by the voltage supply means below said critical value while said given wheel is slipping, and means effective once the relay controlled by the wheel-slip responsive means is picked-up for maintaining it picked-up for a limited time thereafter independently of the wheel-slip responsive means.

15. Brake control apparatus for a wheeled vehicle comprising, in combination, a brake cylinder, manually operative means for causing fluid under pressure to be supplied to the brake cylinder to effect application of the brakes on a vehicle wheel and released from the brake cylinder to effect release of the brakes, means for supplying a direct-current voltage substantially proportional to the rotative speed of the said wheel, a first electroresponsive means controlled according to the voltage supplied by said voltage supply means for automatically causing variation of the pressure of fluid supplied to said brake cylinder by operation of the manually operative means as the voltage supplied by the voltage supply means varies, a second electroresponsive means adapted to be operatively energized only when the voltage supplied by said voltage supply means changes at a rate exceeding a certain rate when the said wheel slips, valve means controlled by the said second electroresponsive means for effecting a rapid reduction in the pressure in said brake cylinder upon operative energization of the second electroresponsive means, and means controlled by said second electroresponsive means and effective when said second electroresponsive means is operatively energized for preventing the first electroresponsive means from operating in response to the reduction in the voltage supplied by the voltage supply means when the said wheel slips.

16. Brake control apparatus for a wheeled vehicle comprising, in combination, a brake cylinder, manually operative means for causing fluid under pressure to be supplied to the brake cylinder to effect application of the brakes on a vehicle wheel and released from the brake cylinder to effect release of the brakes, means for supplying a direct-current voltage substantially proportional to the rotative speed of the said wheel, a first electroresponsive means controlled according to the voltage supplied by said voltage supply means for automatically causing variation of the pressure of fluid supplied to said brake cylinder by operation of the manually operative means as the voltage supplied by the voltage supply means varies, a second electroresponsive means adapted to be operatively energized only when the voltage supplied by said voltage supply means changes at a rate exceeding a certain rate when the said wheel slips, valve means controlled by the said second electroresponsive means for effecting a rapid reduction in the pressure in said brake cylinder upon operative energization of the second electroresponsive means, means controlled by said second electroresponsive means and effective when said second electroresponsive means is operatively energized for preventing the first electroresponsive means from operating in response to the reduction in the voltage supplied by the voltage supply means when the said wheel slips, and means controlled by the pressure in the brake cylinder and adapted upon a reduction of the pressure in the brake cylinder effected by said valve means to below a certain pressure for rendering the last said means non-effective.

17. Brake control apparatus for a wheeled vehicle comprising, in combination, a brake cylinder, manually operative means for causing fluid under pressure to be supplied to the brake cylinder to effect application of the brakes on a vehicle wheel and released from the brake cylinder to effect release of the brakes, means for supplying a direct-current voltage substantially proportional to the rotative speed of the said wheel, a first electroresponsive means controlled according to the voltage supplied by said voltage supply means for automatically causing variation of the pressure of fluid supplied to said brake cylinder by operation of the manually operative means as the voltage supplied by the voltage supply means varies, a second electroresponsive means adapted to be operatively energized only when the voltage supplied by said voltage supply means changes at a rate exceeding a certain rate when the said wheel slips, valve means controlled by the said second electroresponsive means for effecting a rapid reduction in the pressure in said brake cylinder upon operative energization of the second electroresponsive means, means controlled by said second electroresponsive means and effective when said second electroresponsive means is operatively energized for preventing the first electroresponsive means from operating in response to the reduction in the voltage supplied by the voltage supply means when the said wheel slips, and means controlled according to the pressure in the brake cylinder for causing the valve means to terminate the reduction of the pressure in the brake cylinder when the brake cylinder pressure is reduced thereby to below a certain pressure and adapted also to render the last said means non-effective in response to the reduction of the pressure in the brake cylinder below said certain pressure.

18. Brake control apparatus for a wheeled vehicle, comprising, in combination, means for causing application and release of the brakes associated with the vehicle wheels, a speed relay adapted to be picked-up when the rotative speed of a given vehicle wheel exceeds a certain speed and dropped-out when the rotative speed of the given wheel reduces below said certain speed, a slip-control relay adapted to be picked-up when the said given wheel begins to slip, a first valve means controlled by the said speed relay for effecting a predetermined percentage of reduction in the degree of application of the brakes associated with all the vehicle wheels that is in effect when the rotative speed of the given wheel reduces below said certain speed, a second valve means controlled by said slip-control relay and effective to initiate and maintain a continued reduction in the degree of application of the brakes associated with certain wheels including the given wheel when and while the said slip-control relay is picked-up, means controlled according to the degree of application of the brakes for causing said slip-control relay to remain picked-up, once it is picked-up, until the degree of application of the brakes reduces below a certain value and then causing it to drop-out so as to cause the said second valve means to terminate the reduction in the degree of application of the brakes effected thereby and initiate an increase in the degree of application of the brakes, and a holding circuit for maintaining the speed relay picked-up adapted to be established if the speed relay is picked-up when the slip-control relay is picked-up, and maintained established as long as the said slip-control relay is picked-up whereby to prevent the drop-out of the speed relay in response to the reduction in the rotative speed of the given wheel while it slips so as to prevent the reduction in the degree of application of the brakes by the said first means in response to the slipping of the said wheel.

19. Brake control apparatus for a vehicle having a plurality of separately rotatable wheels comprising, in combination, a relay valve mechanism operative in response to a control fluid pressure supplied thereto to supply fluid under pressure for effecting application of the brakes associated with the said wheels and including a plurality of electroresponsive means adapted when energized or deenergized in different combinations to so vary the condition of the relay valve mechanism as to cause it to supply fluid at different pressures in response to a given control pressure, and individual means, for each of a plurality of said wheels controlled respectively according to the rotative speed of the corresponding wheel for controlling energization and deenergization of a corresponding one of said electroresponsive means so as to automatically cause variation of the degree of application of the brakes by the relay valve mechanism as the speed of the vehicle varies.

20. Brake control apparatus for a vehicle having a plurality of separately rotatable wheels comprising, in combination, manually controlled means for establishing different predetermined control fluid pressures in accordance with a desired degree of application of the brakes, a relay valve mechanism operative in response to the control fluid pressure established for supplying fluid pressure to cause application of the brakes associated with said wheels, said relay valve mechanism including a plurality of electroresponsive means adapted to so vary the condition of the relay valve mechanism, depending upon the energization or deenergization thereof in different combinations, that the relay valve mechanism supplies fluid at different pressures in response to a given control fluid pressure, individual means associated with each of a plurality of said wheels for supplying a voltage substantially proportional to the rotative speed of the corresponding wheel, and a plurality of voltage-responsive relays each of which is controlled in accordance with the voltage supplied by a corresponding voltage supply means and adapted to control the energization and deenergization of a corresponding one of said electroresponsive means of said relay valve mechanism so as to vary the condition of the relay valve mechanism automatically as the speed of the vehicle changes.

21. Brake control apparatus for a vehicle having a plurality of separately rotatable wheels comprising, in combination, manually controlled means for establishing different predetermined control fluid pressures in accordance with a desired degree of application of the brakes, a relay valve mechanism operative in response to the control fluid pressure established for supplying fluid pressure to cause application of the brakes associated with said wheels, said relay valve mechanism including a plurality of electroresponsive means adapted to so vary the condition of the relay valve mechanism, depending upon the energization or deenergization thereof in different combinations, that the relay valve mechanism supplies fluid at different pressures in response to a given control fluid pressure, individual means associated with each of a plurality of said wheels for supplying a voltage substantially proportional to the rotative speed of the corresponding wheel, a plurality of voltage-responsive relays each of which is controlled in accordance with the voltage supplied by a corresponding voltage supply means and adapted to control the energization and deenergization of a corresponding one of said electroresponsive means of said relay valve mechanism so as to vary the condition of the relay valve mechanism automatically as the speed of the vehicle changes, and means rendered effective in response to the slipping of any of said wheels for preventing the response of any of said voltage-responsive relays to the reduction in the rotative speed of the corresponding wheel while the wheel slips whereby to prevent a variation of the condition of the relay valve mechanism in response to the slipping of the vehicle wheel.

22. Brake control apparatus for a vehicle having a plurality of separately rotatable wheels comprising, in combination, manually controlled means for establishing a control fluid pressure variable in accordance with a desired degree of application of the brakes, a relay valve mechanism operative in response to the control fluid pressure to cause fluid under pressure to be supplied to effect application of the brakes on said wheels, said relay valve mechanism including a plurality of electroresponsive means adapted to so vary the condition of the relay valve mechanism, depending upon the energization or deenergization of the electroresponsive means in different combinations, that the relay valve mechanism supplies fluid at correspondingly different pressures in response to a given control pressure, individual means associated with each of a plurality of said wheels for supplying a voltage substantially proportional to the rotative speed of the corresponding wheel, a plurality of voltage-responsive relays each of which is controlled according to the voltage supplied by a different one of said voltage supply means, the voltage-responsive relays being so designed as to be operatively responsive to different critical voltages corresponding respectively to different critical speeds of the vehicle and adapted severally to control energization or deenergization of a corresponding one of said electroresponsive means of the relay valve mechanism in such a manner as to cause the automatic reduction by said relay valve mechanism of the degree of application of the brakes in successive steps as the speed of the vehicle reduces.

23. Brake control apparatus for a wheeled vehicle comprising, in combination, manually controlled means for causing application and release of the brakes associated with the vehicle wheels, means for supplying a direct-current voltage substantially proportional to the rotative speed of a given vehicle wheel, a voltage-responsive relay having a winding energized in accordance with the voltage supplied by said voltage supply means, a resistor, a switch device adapted to automatically cut said resistor into series relation with the winding of the said voltage-responsive relay when the manually controlled means is operated to effect application of the brakes and adapted to cut said resistor out of the circuit when the manually controlled means is operated to effect release of the brakes, said resistor being so designed as to cause the voltage-responsive relay to drop-out in response to a decreasing voltage at substantially the same critical voltage as that at which it is picked-up in response to an increasing voltage, and electroresponsive means adapted to be energized or deenergized dependent upon whether the voltage-responsive relay is picked-up or dropped-out, said electroresponsive means being effective when energized to cause a certain degree of application of the brakes to be effected and when deenergized to cause a different degree of application of the brakes to be effected.

24. Brake control apparatus for a wheeled vehicle comprising, in combination, manually controlled means for causing application and release of the brakes associated with the vehicle wheels, means for supplying a direct-current voltage substantially proportional to the rotative speed of a certain vehicle wheel, a voltage-responsive relay having a winding that is energized in accordance with the voltage supplied by said voltage supply means, a resistor in series-circuit relation with the winding of said relay, a switch device automatically operative in response to the operation of the manual controlled means to effect application of the brakes to open a shunt connection around the resistor and adapted upon operation of the manual controlled means to effect release of the brakes to establish a shunt connection around said resistor, said resistor being so designed that when the shunt connection is open the voltage impressed on the winding of said voltage-responsive relay is such as to cause the relay to drop-out upon a decreasing voltage at substantially the same voltage supplied by the voltage supply means as that at which it was picked-up upon an increasing voltage, and electroresponsive valve means adapted to be energized or deenergized dependent upon whether said voltage-responsive relay is picked-up or dropped-out, said electroresponsive valve means being effective when energized to cause a certain degree of application of the brakes to be effected and when deenergized to cause a different degree of the brakes to be effected.

25. Brake control apparatus for a wheeled vehicle comprising, in combination, manually controlled means for establishing a control fluid pressure variable in accordance with a desired degree of application of the brakes, a relay valve mechanism operatively responsive to the control fluid pressure for supplying fluid under pressure to effect application of the brakes associated with the vehicle wheels, said relay valve mechanism including an electroresponsive means effective when energized to condition the relay valve mechanism to supply fluid at a certain pressure in response to a given control fluid pressure and effective when deenergized to cause the relay valve mechanism to supply fluid at a different pressure in response to said given control pressure, means for supplying a direct-current voltage substantially proportional to the rotative speed of a vehicle wheel, a voltage-responsive relay having a winding on which the voltage supplied by said voltage supply means is impressed and adapted to effect energization or deenergization of the electroresponsive means of the relay valve mechanism, a resistor in series-circuit relation with the winding of the voltage-responsive relay, and a fluid pressure controlled switch device controlled according to the control fluid pressure for cutting said resistor into the circuit during an application of the brakes and cutting it out of the circuit when the brakes are released, said resistor being so designed as to cause the said voltage-responsive relay to drop-out at substantially the same voltage supplied by the voltage supply means as that at which it is picked-up.

26. Brake control apparatus for a wheeled vehicle comprising, in combination, manually controlled means for establishing a control fluid pressure varying according to the desired degree of application of the brakes, a relay valve mechanism operative in response to the control fluid pressure to supply fluid under pressure to effect application of the brakes associated with the vehicle wheels, said relay valve mechanism including a plurality of electroresponsive means adapted to so vary the condition of the relay valve mechanism, dependent upon the energization or deenergization thereof in different combinations, that the relay valve mechanism supplies fluid at different pressures in response to a given control pressure for each combination of the electroresponsive means, means for supplying a voltage substantially proportional to the rotative speed of a vehicle wheel, a plurality of voltage-responsive relays one for each of said electroresponsive means of the relay valve mechanism, said voltage-responsive relays having the windings thereof connected in series relation and subject to the voltage supplied by said voltage supply means, the windings of the voltage-responsive relays being respectively so designed as to cause pick-up of the relays at different voltages, the relays being adapted to effect energization or deenergization of a corresponding one of said electroresponsive means of the relay valve mechanism depending upon whether the relay is picked-up or dropped-out, a resistor in series-circuit relation with the windings of said voltage-responsive relays, and a pressure switch controlled by the control fluid pressure and effective when the brakes are applied to cut said resistor into the circuit and when the brakes are released to cut said resistor out of the circuit, said resistor being adapted to cause each of the voltage-responsive relays to drop-out at substantially the same speed as that at which they were respectively picked-up.

27. Brake control apparatus for a wheeled vehicle comprising, in combination, manually controlled means for establishing a control fluid pressure varying in accordance with a desired degree of application of the brakes, a relay valve mechanism operatively responsive to the control fluid pressure established for supplying fluid under pressure to cause application of the brakes associated with the vehicle wheels, said relay valve mechanism including a plurality of electroresponsive means adapted to vary the condition of the relay valve mechanism dependent upon the energization and deenergization of the electroresponsive means in different combinations so that the relay valve mechanism supplies fluid at a different pressure for each combination of the electroresponsive means in response to a given control fluid pressure, means for supplying a voltage substantially proportional to the rotative speed of a given wheel of the vehicle, a plurality of voltage-responsive relays having their windings subject in series-relation to the voltage supplied by the voltage supply means and so designed that the relays pick-up respectively in response to different voltages corresponding to different vehicle speeds, each of said voltage-responsive relays being adapted to control energization and deenergization of a corresponding different one of the electroresponsive means of the relay valve mechanism, and means operatively responsive to slipping of the said given wheel for maintaining one or more of the voltage-responsive relays picked-up, if the relay is picked up at the time slipping of the given wheel occurs, to prevent a variation of the condition of the relay valve mechanism and the consequent variation in the degree of application of the brakes by said relay valve mechanism in response to the slipping of the said given wheel.

ANDREW J. SORENSEN.